US010235662B2

(12) United States Patent
Curtis

(10) Patent No.: US 10,235,662 B2
(45) Date of Patent: Mar. 19, 2019

(54) UNUSUAL USAGE ALERTS

(71) Applicant: Opower, Inc., Arlington, VA (US)

(72) Inventor: Richard Tyler Curtis, Washington, DC (US)

(73) Assignee: OPOWER, INC., Arlington, VA (US)

( * ) Notice: Subject to any disclaimer, the term of this patent is extended or adjusted under 35 U.S.C. 154(b) by 530 days.

(21) Appl. No.: 14/577,929

(22) Filed: Dec. 19, 2014

(65) Prior Publication Data

US 2016/0005015 A1 Jan. 7, 2016

Related U.S. Application Data

(60) Provisional application No. 62/019,822, filed on Jul. 1, 2014.

(51) Int. Cl.
*G06Q 20/14* (2012.01)
*G06Q 50/06* (2012.01)

(52) U.S. Cl.
CPC .......... *G06Q 20/145* (2013.01); *G06Q 50/06* (2013.01); *Y04S 50/12* (2013.01)

(58) Field of Classification Search
USPC .................................................. 705/35–40
See application file for complete search history.

(56) References Cited

U.S. PATENT DOCUMENTS

| 4,334,275 | A | 6/1982 | Levine |
| 4,843,575 | A | 6/1989 | Crane |
| 5,513,519 | A | 5/1996 | Cauger et al. |
| 5,566,084 | A | 10/1996 | Cmar |

(Continued)

FOREIGN PATENT DOCUMENTS

| AU | 2010315015 | 7/2014 |
| CA | 2779754 | 5/2011 |

(Continued)

OTHER PUBLICATIONS

Mint.com, "We're always on alert." Alerts for bills, fees & going over budget, 2 pages, Jul. 12, 2013, available at: https://www.mint.com/how-it-works/alerts/.*

(Continued)

*Primary Examiner* — Alexander G Kalinowski
*Assistant Examiner* — Hatem M Ali
(74) *Attorney, Agent, or Firm* — Kraguljac Law Group, LLC

(57) ABSTRACT

Techniques for unusual usage alerts without smart meter data are provided. The computing device can determine a set of climate control disaggregation coefficients and obtain weather data corresponding to at least a portion of a billing period. In turn, the computing device can determine first forecasted usage data for the at least a portion of the billing period based on the set of climate control disaggregation coefficients and the weather data, and determine second forecasted usage data for a length of the billing period based at least in part on the first forecasted usage data. In some aspects, the computing device can project unusual energy usage for the billing period based on the second forecasted usage data determined to be greater than usage data for a prior time period. The computing device can generate an alert notification including an indication of the unusual energy usage projection.

21 Claims, 10 Drawing Sheets

(56) References Cited

U.S. PATENT DOCUMENTS

| | | | |
|---|---|---|---|
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,948,303 A | 9/1999 | Larson | |
| 6,035,285 A | 3/2000 | Schlect et al. | |
| 6,088,688 A | 7/2000 | Crooks et al. | |
| 6,295,504 B1 | 9/2001 | Ye et al. | |
| 6,327,605 B2 | 12/2001 | Arakawa et al. | |
| 6,701,298 B1 | 3/2004 | Jutsen | |
| 6,732,055 B2 | 5/2004 | Bagepalli et al. | |
| 6,778,945 B2 | 8/2004 | Chassin et al. | |
| 6,785,620 B2 | 8/2004 | Kishlock et al. | |
| 6,972,660 B1 | 12/2005 | Montgomery, Jr. et al. | |
| 7,020,508 B2 | 3/2006 | Stivoric et al. | |
| 7,073,073 B1 | 7/2006 | Nonaka et al. | |
| 7,073,075 B2 | 7/2006 | Freyman et al. | |
| 7,136,710 B1 | 11/2006 | Hoffberg et al. | |
| 7,142,949 B2 | 11/2006 | Brewster et al. | |
| 7,149,727 B1 | 12/2006 | Nicholls et al. | |
| 7,200,468 B2 | 4/2007 | Ruhnke et al. | |
| 7,243,044 B2 | 7/2007 | McCalla | |
| 7,333,880 B2 | 2/2008 | Brewster et al. | |
| 7,356,548 B1 | 4/2008 | Culp et al. | |
| 7,444,251 B2 | 10/2008 | Nikovski et al. | |
| 7,460,502 B2 | 12/2008 | Arima et al. | |
| 7,460,899 B2 | 12/2008 | Almen | |
| 7,552,030 B2 | 6/2009 | Guralnik et al. | |
| 7,561,977 B2 | 7/2009 | Horst et al. | |
| 7,991,513 B2 | 8/2011 | Pitt | |
| 8,065,098 B2 | 11/2011 | Gautam | |
| 8,166,047 B1 | 4/2012 | Cohen et al. | |
| 8,180,591 B2 | 5/2012 | Yuen et al. | |
| 8,239,178 B2 | 8/2012 | Gray et al. | |
| 8,260,468 B2 | 9/2012 | Ippolito et al. | |
| 8,275,635 B2 | 9/2012 | Stivoric et al. | |
| 8,280,536 B1 | 10/2012 | Fadell et al. | |
| 8,348,840 B2 | 1/2013 | Heit et al. | |
| 8,375,118 B2 | 2/2013 | Hao et al. | |
| 8,417,061 B2 | 4/2013 | Kennedy et al. | |
| 8,478,447 B2 | 7/2013 | Fadell et al. | |
| 8,489,245 B2 | 7/2013 | Carrel et al. | |
| 8,583,288 B1 | 11/2013 | Rossi et al. | |
| 8,630,741 B1 | 1/2014 | Matsuoka et al. | |
| 8,660,813 B2 | 2/2014 | Curtis et al. | |
| 8,690,751 B2 | 4/2014 | Auphan | |
| 8,751,432 B2 | 6/2014 | Berg-Sonne et al. | |
| 8,805,000 B2 | 8/2014 | Derby et al. | |
| 9,031,703 B2 | 5/2015 | Nakamura et al. | |
| 2002/0065581 A1 | 5/2002 | Fasca | |
| 2002/0178047 A1 | 11/2002 | Or et al. | |
| 2002/0198629 A1 | 12/2002 | Ellis | |
| 2003/0011486 A1 | 1/2003 | Ying | |
| 2003/0018517 A1 | 1/2003 | Dull et al. | |
| 2003/0023467 A1 | 1/2003 | Moldovan | |
| 2003/0216971 A1* | 11/2003 | Sick | G01D 4/004 |
| | | | 705/7.36 |
| 2004/0024717 A1 | 2/2004 | Sneeringer | |
| 2004/0111410 A1 | 6/2004 | Burgoon et al. | |
| 2004/0140908 A1 | 7/2004 | Gladwin et al. | |
| 2005/0257540 A1 | 11/2005 | Choi et al. | |
| 2006/0089851 A1 | 4/2006 | Silby et al. | |
| 2006/0103549 A1 | 5/2006 | Hunt et al. | |
| 2007/0061735 A1 | 3/2007 | Hoffberg et al. | |
| 2007/0203860 A1 | 8/2007 | Golden et al. | |
| 2007/0213992 A1 | 9/2007 | Anderson et al. | |
| 2007/0255457 A1 | 11/2007 | Whitcomb et al. | |
| 2007/0260405 A1 | 11/2007 | McConnell et al. | |
| 2008/0027885 A1 | 1/2008 | van Putten et al. | |
| 2008/0167535 A1 | 7/2008 | Stivoric et al. | |
| 2008/0195561 A1 | 8/2008 | Herzig | |
| 2008/0281473 A1* | 11/2008 | Pitt | G06Q 30/02 |
| | | | 700/291 |
| 2008/0281763 A1 | 11/2008 | Yliniemi | |
| 2008/0306985 A1 | 12/2008 | Murray et al. | |
| 2009/0106202 A1 | 4/2009 | Mizrahi | |
| 2009/0204267 A1 | 8/2009 | Sustaeta et al. | |
| 2009/0326726 A1 | 12/2009 | Ippolito et al. | |
| 2010/0025483 A1 | 2/2010 | Hoeynck et al. | |
| 2010/0076835 A1 | 3/2010 | Silverman | |
| 2010/0082174 A1 | 4/2010 | Weaver | |
| 2010/0099954 A1 | 4/2010 | Dickinson et al. | |
| 2010/0138363 A1* | 6/2010 | Batterberry | G06Q 10/04 |
| | | | 705/412 |
| 2010/0156665 A1 | 6/2010 | Krzyzanowski et al. | |
| 2010/0179704 A1 | 7/2010 | Ozog | |
| 2010/0198713 A1 | 8/2010 | Forbes, Jr. et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1 | 8/2010 | Crabtree et al. | |
| 2010/0232671 A1 | 9/2010 | Dam et al. | |
| 2010/0286937 A1 | 11/2010 | Hedley et al. | |
| 2010/0289643 A1 | 11/2010 | Trundle et al. | |
| 2010/0324962 A1* | 12/2010 | Nesler | G01R 21/133 |
| | | | 705/7.36 |
| 2010/0332373 A1 | 12/2010 | Crabtree et al. | |
| 2011/0022429 A1 | 1/2011 | Yates et al. | |
| 2011/0023045 A1 | 1/2011 | Yates et al. | |
| 2011/0040666 A1 | 2/2011 | Crabtree et al. | |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1* | 9/2011 | Irving | G06Q 30/00 |
| | | | 705/80 |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2013/0060531 A1 | 3/2013 | Burke et al. | |
| 2013/0060720 A1 | 3/2013 | Burke | |
| 2013/0173064 A1 | 7/2013 | Fadell et al. | |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0337107 A1 | 11/2014 | Foster | |
| 2015/0088734 A1* | 3/2015 | Lesbirel | G06Q 20/145 |
| | | | 705/40 |
| 2015/0227846 A1 | 8/2015 | Mercer et al. | |
| 2015/0267935 A1 | 9/2015 | Devenish et al. | |
| 2015/0269664 A1 | 9/2015 | Davidson | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |

FOREIGN PATENT DOCUMENTS

| | | |
|---|---|---|
| CA | 2832211 | 11/2012 |
| DE | 3703387 | 8/1987 |
| DE | 102011077522 | 12/2012 |

(56) References Cited

FOREIGN PATENT DOCUMENTS

| | | |
|---|---|---|
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007133468 A | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

"Popups Climate Change: Carbon Calculator—Greenhouse Gas and Carbon Dioxide Calculator Wed Pages," The Nature Conservancy, 5 pages, Feb. 29, 2008, available at http://web.archive.org/web/2008022907420/www.nature.org/popups/misc/art20625.html.*
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.*
Mint.com, "Budgets you'll actually stick to," Budgeting-Calculate and Categorize your spending, 2 pages, Jul. 12, 2013, available at: ttps://www.nnint.com/how-it-works/budgeting/.*
International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Solfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." http://jawbone.com/up/, 7 pages, Jul. 15, 2013.
Leisch, Friedrich, "FlexMix: A General Framework for Finite Mixture Models and Latent Class Regression in R," Journal of Statistical Software, httn://www.istatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.

(56) References Cited

OTHER PUBLICATIONS

Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
International Search Report and Written Opinion—PCT/US2015/038692—dated Sep. 24, 2015.

\* cited by examiner

UNUSUAL USAGE ALERTS

CROSS-REFERENCE TO RELATED APPLICATIONS

The present application claims the benefit of priority to U.S. Provisional Application No. 62/019,822, filed Jul. 1, 2014, entitled "UNUSUAL USAGE ALERTS WITHOUT SMART METER DATA," which is hereby incorporated by reference in its entirety.

BACKGROUND

The subject technology relates to data processing systems, and in particular, to unusual usage alerts without smart meter data.

With smart meter data, an alert can be sent to customers before the end of a billing period, for example, to alert the customers of a projected high bill amount, allowing them time to change their behavior before the conclusion of the billing cycle. As such, alerts based on smart meter data can help provide advanced notifications to customers that have a high likelihood of receiving a large bill, e.g., before the bill is issued. Unexpectedly higher bills have several ill effects, including increased customer churn (in competitive markets where customers may select a resource provider from a number of different choices), increased call volume, and/or an increase in late or partial payments, especially for customers on limited or fixed incomes.

SUMMARY

In some aspects, the subject technology relates to a computing device for generating and sending unusual usage alerts, without the use of smart meter data. In some implementations, the computing device includes at least one processor and a memory for storing instructions that, when executed by the processor, cause the computing device to perform specified operations including, determining a set of climate control disaggregation coefficients associated with energy consumption data of a commodity for a utility customer. The set of climate control disaggregation coefficients may include one or more coefficients relating to a rate of energy consumption for a corresponding type of climate control. In some aspects, the computing device obtains weather data for at least a portion of a billing period, and uses the weather data to determine first forecasted usage data for the billing period based on the climate control disaggregation coefficients. In some aspects, second forecasted usage data is determined for a length of the billing period based on the first forecasted usage data, and an unusual energy usage projection is determined for the utility customer if the second forecasted usage data is greater than usage data for a prior time period corresponding to the billing period. In some aspects, the computing device can be further configured to generate an alert notification including the unusual energy usage projection.

In another aspect, the subject technology relates to a method for generating unusual usage alerts. Depending on the desired implementation, the method can include steps for determining a set of climate control disaggregation coefficients associated with energy consumption data of a commodity for a utility customer, and determining first weather data for a first portion of a billing period. In some implementations, the method can further include steps for determining a first forecasted usage for the first portion of the billing period based on the climate control disaggregation coefficients and the first weather data, and determining second weather data corresponding to a second portion of the billing period. In such aspects, the second portion may be subsequent in time to that of the first portion. In turn, the method can further include steps for determining a second forecasted usage for the second portion of the billing period based on the set of climate control disaggregation coefficients and the second weather data. As such, an unusual energy usage projection for the particular utility customer can be determined, for example, based on a combination of the first forecasted usage and the second forecasted usage being greater than usage data for a prior time period corresponding to the billing period. Additionally, in some aspects, an alert notification can be generated, wherein the alert notification includes an indication of the unusual energy usage projection.

In still another aspect, the subject technology relates to a non-transitory computer readable storage medium for storing instructions for generating unusual usage alerts using a computing device. Depending on implementation, the instructions, when executed by a processor, can cause the computing device to execute operations, including, determining a set of climate control disaggregation coefficients associated with energy consumption data of a commodity for a utility customer, and obtaining weather data corresponding to a portion of a billing period. In some implementations, the computing may be further configured to determine first forecasted usage data for at least a portion of the billing period, for example, based on the set of climate control disaggregation coefficients and the weather data. In another approach, the computing device can determine second forecasted usage data for a length of the billing period based on the first forecasted usage data, and determine an unusual energy usage projection for the utility customer based on the second forecasted usage data being greater than usage data for a prior time period corresponding to the billing period.

In some aspects, the computing device can be configured to determine if the unusual energy usage projection or an actual usage projection, indicate that a utility bill for the particular utility customer is greater than a threshold. The actual usage projection may relate to actual usage data associated with one or more utility customers similar to the particular utility customer. The computing device can generate an alert notification including an indication of the unusual energy usage projection. In some aspects, the indication can include information relating to a cause for an increase in the utility bill based on the unusual energy usage projection and/or the actual usage projection determined to be greater than the threshold.

BRIEF DESCRIPTION OF THE DRAWINGS

In the following description, reference is made to the following figures, and in which are shown by way of illustration specific embodiments in which the subject technology may be practiced. It is to be understood that other embodiments may be utilized and changes may be made without departing from the scope of the subject technology.

DETAILED DESCRIPTION

Figure 1:
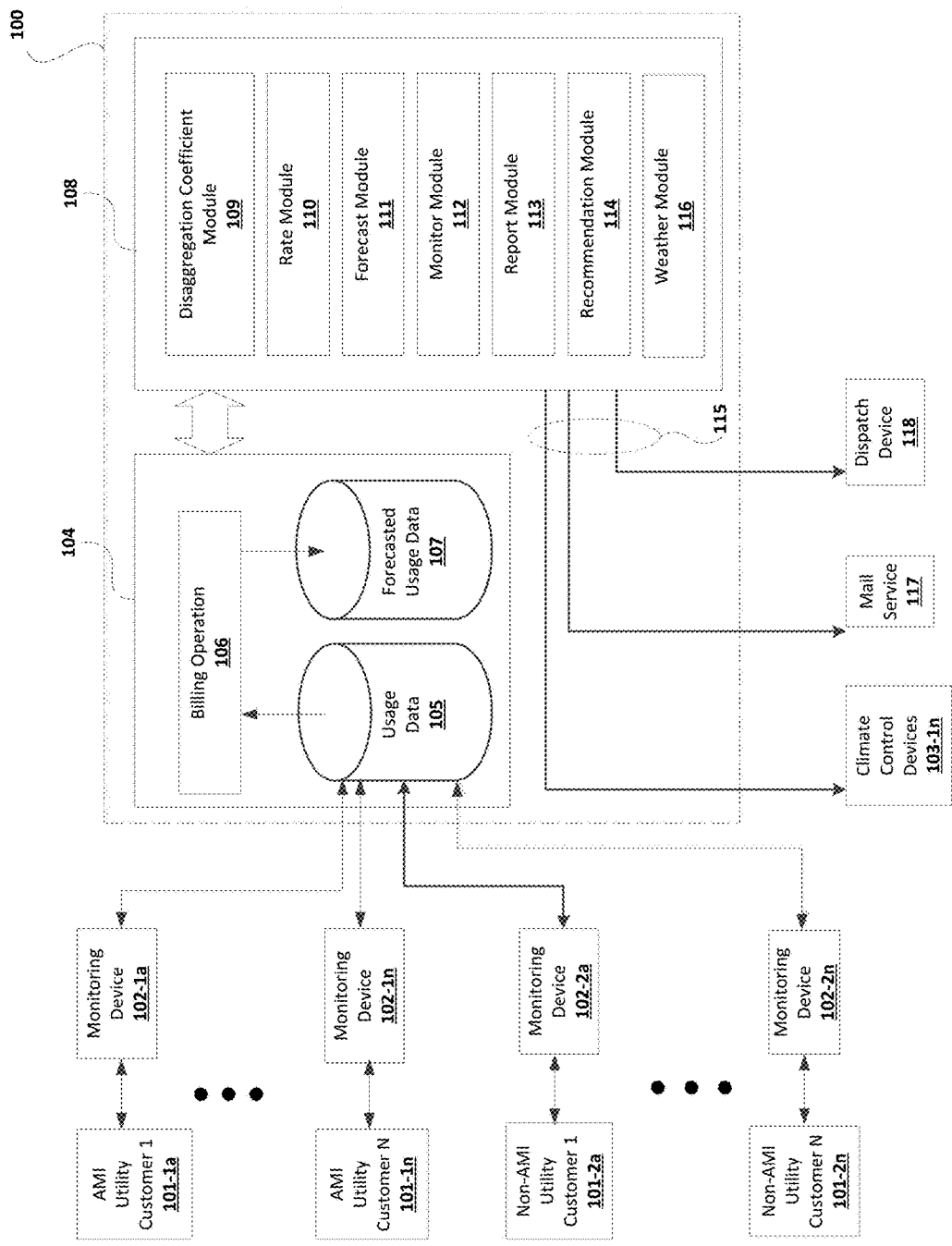
FIG. 1 illustrates an example of an energy usage alert system, according to certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the subject technology enable a system to determine that a customer may experience unusual resource usage (e.g., higher energy consumption) for a billing period based on climate information and, in response, provide an alert notification to the customer before the end of the billing period or before the customer receives the bill for that period. The subject technology may be implemented in systems that do not use a smart meter to measure customer resource (e.g., energy) usage and, in fact, provides a technical solution to a number of technical problems with systems that do not use smart meters to provide unusual usage alert notifications before the end of a billing period.

A smart meter is a device that records the consumption or use of resources (e.g., electricity) at particular time intervals. Depending on the implementation, various time intervals may be used. For example, a smart meter may be configured to record resource consumption levels once an hour, once every 15 minutes, once every minute, or some other interval. Smart meters may also be configured to transmit data (e.g., resource usage interval data), for example, to utility servers via a network, such as the Internet. The smart meter data may be transmitted in real time or in batches.

In contrast to smart meters, other resource meters do not transmit usage data in between measuring events (e.g., billing periods). Some technical limitations of systems not using smart meters stem from the inability to obtain usage data before the end of a billing period using these other resource meters. Due to the unavailability of recent consumption data (e.g., within a current billing period) it has been difficult to determine if the customer's usage rate is unusual, in turn, preventing the ability to provide an alert/notification to indicate the unusual usage before the end of the billing period.

Aspects of the subject technology address these and other technical problems by providing ways to determine (or project) an unusual resource usage for a customer, for example, using historic consumption and weather data. In some aspects, a level of sensitivity for resource usage, with respect to corresponding weather changes is used to determine, climate control disaggregation coefficients that can be used to help project or predict future resource consumption. Accordingly, weather data and the level of sensitivity may be used instead of (or in addition to) power load data. It is understood that aspects of the technology can be implemented without the use of smart meters, and in some implementations, smart meter data may be used to facilitate aspects of the subject technology.

As described herein "systems" of the subject technology may be implemented using one or more servers, a climate control device, a computing device (which may or may not be in communication with the climate control device or other appliance), a mobile device, and/or a combination of devices.

As used herein, "usage" refers to a quantity of use, a cost associated with the use, and/or a quantified metric representing the use or cost. The term "actual energy usage" refers to a meter reading or a usage reading. The term "commodity" refers to a utility-based commodity, such as electricity, water, or natural gas, which are consumable resources delivered to an entity, dwelling or commercial structure. The term "component of a property" refers to a component associated with the property that is able to consume a commodity. One example of a component of a property may be a heating, ventilation and air conditioning (HVAC) system that controls the climate within the property using electricity, natural gas, and/or another energy commodity. The component may relate to one or more of a central heating device, a central air conditioning and heating system, an appliance, an electronic device, water heating system, a power generating device, a ventilation system, or an air filtration system, etc.

FIG. 1 illustrates an example of an energy usage alert system 100, according to certain aspects of the subject technology. Energy usage alert system 100 includes a utility management system 104 and a billing management system 108. In some aspects, management system 104 can be coupled to utility customers 101-1 via monitoring devices 102-1 and/or climate control devices 103-1. Depending on implementation, monitoring devices 102-1 may be non-Advanced Metering Infrastructure (AMI) based power metering devices, such as monitoring devices 102-2a-102-2n. Alternatively, management system 104 may be associated with utility customers (e.g., 101-1a-101-1n) via an AMI-based monitoring device or "smart metering device" such as monitoring devices 102-1a-102-1n. Similarly, the utility management system 104 can be associated with utility customers 101-2 via any of communication channels 115, including but not limited to: climate control devices 103-1n, mail service 117 and/or dispatch device 118.

In the example of FIG. 1, utility management system 104 includes usage database 105, billing operation module 106 and forecasted usage data database 107. In turn, billing management system 108 includes disaggregation coefficient module 109, rate module 110, forecast module 111, monitor module 112, report module 113, recommendation module 114 and weather module 116. Billing management system 108 may convey information targeted to one or more of the utility customers 101-1a-101-1n and 101-2a-101-2n over communication channels 115.

Communication channels 115 include climate control device(s) 103-1n, mail service 117 and dispatch device 118; however, other communication channels may be implemented. Climate control device(s) 103-1n can include various devices, such as "smart thermostats," configured to provide information output in a location associated with the power-consuming customer. In some approaches, mail service 117 may be a print service, for example, that is configured for printing notifications/communications that are provided by report module 113, to one or more of utility customers 101-1a-101-1n.

Utility management system 104 stores usage data in the usage database 105. In some aspects, usage data is associated with one or more commodities consumed by utility customers 101-1a-101-1n. As used herein, usage data can include usage information corresponding to amounts of resource consumption for at least one of the one or more commodities for multiple utility customers (e.g., utility customers 101-1a . . . 101-1n, or 101-2a . . . 101-2n).

It is understood that usage data can be collected or aggregated from various reading types, including one-directional interval readings wherein usage data is provided to a utility or other data collector at certain time intervals (e.g., once per billing cycle, once per month, or on a weekly basis etc.

Independent of the collection method used, usage data can relate to a monetary amount of actual usage to date (e.g., a monetary value ($20)) or an amount of energy used (e.g., 1.4 kWh) in the billing period. The usage information may include past usage information of the commodity e.g., for one or more completed billing periods. In some implementations, usage data (e.g., "usage interval data") includes usage information corresponding to billed usage of at least one commodity for multiple utility customers (e.g., utility customers 101-2a, 101-2b . . . 101-2n) without smart meter data. There exists a technical problem wherein the non-smart meter data limits sending the alert to the corresponding utility customers until the end of the billing period. This and other technical problems are addressed by the subject technology.

In some aspects, usage data for a utility customer is obtained from a corresponding monitoring device on a scheduled basis, periodic basis or a non-scheduled basis. Historic usage data may also be associated with customers, or the site at which the commodity is consumed. For example, usage interval data for electric power may be associated with a particular customer (e.g., a customer account) or may be associated with a location (e.g., a residence or business) where the electric power is used or consumed.

In practice, utility management system 104 stores and forwards usage data to the billing management system 108 for usage alert processing. Utility management system 104 described herein may be implemented by a utility company or an offsite third party service provider interfaced with the utility company.

In some aspects, utility management system 104 stores projected usage information in forecasted usage data database 107. The projected usage information may be based on the usage data and estimated usage for a remaining amount of time in the current billing period. For example, the billing operation module 106 may obtain the usage data to determine a rate of use for the corresponding utility customer. Depending on implementation, the rate of use can be based on the amount of energy consumed over a specified time period, such as a predetermined number of days. The rate of use may be applied to the remaining amount of time to determine the estimated usage. As such, the projected usage information may consist of the usage data to date and the estimated usage for the remaining time in the billing period. A more detailed description of the projected use determination is described in FIG. 2.

In some approaches, disaggregation coefficient module 109 is configured to determine a set of climate control disaggregation coefficients relating to one or more of utility customers 101-1a-101-1n and 101-2a-101-2n, e.g., with respect to one or more billing periods. In an aspect, the disaggregation coefficient module 109 includes an interface to monitoring devices 102-1a-102-1n and 102-2a-102-2n, for example, to associate three coefficients (e.g., base-load, cooling, heating) for each meter. Examples of energy disaggregation are described in U.S. Pat. No. 8,660,813, which is hereby incorporated by reference in its entirety.

Rate module 110 may store a local copy of a rate schedule associated with the fees for commodities provided by the utility company. In some aspects, rate module 110 is configured to obtain the rate schedule associated with the current billing period, from the utility company, e.g., via a network such as the Internet. In turn, forecast module 111 is configured to determine the projected use of energy (e.g., an energy use forecast) by utility customers 101-1a-101-1n and 101-2a-101-2n based on the corresponding usage data (e.g., non-AMI data or AMI data). The forecast module 111 may perform a process configured to determine the projected usage information using rate of use information and billing period information.

In some implementations, monitor module 112 includes an interface to monitoring devices 102-1a-102-1n and 102-2a-102-2n, e.g., to obtain usage data directly and/or include an interface with utility management system 104, for example, to receive usage data for further processing by one or more components of billing management system 108 (e.g., projected use information, rate of use information). Likewise, report module 113 may be configured to generate a usage alert notification, and cause the usage alert notification to be sent to one or more of the utility customers 101a-101n based on one or more reporting conditions, including but not limited to, unusual usage alert caused by weather-related usage, projected bill exceeding a target budget, current billing period ended, utility customer inquiry, etc. Recommendation module 114 may be configured to generate one or more recommendations for reducing an unusually high utility bill or for steps that may be taken towards power conservation.

The weather module 116 may be configured to obtain weather data (e.g., past weather conditions and forecasted weather conditions) from a third party weather service, for example, via an application programming interface (API). In an aspect, weather module 116 is configured to fetch data relating to forecasted weather conditions, for example, based on historical weather data of a corresponding geographic location and time period.

Communication channels 115 may carry alert notifications to the utility customers 101-1a-101-1n and 101-2a-101-2n over wired and/or a wireless communication channels. In an aspect, the billing management system 108 sends the alert notifications in a broadcast and/or multicast signal to the utility customers 101-1a-101-1n and 101-2a-101-2n via climate control devices 103-1n. In another aspect, alert notifications may be sent to one or more of utility customers 101-1a-101-1n and 101-2a-101-2n using a print service and/or mail provider, such as mail service 117. In yet another aspect, other communication channels such as short messaging service (SMS), email, and or automated-telephone dialing may be used, for example via dispatch device 118, which can include various hardware and software modules, as well as network connectivity necessary for dispatching electronic alert notifications.

In some implementations, billing management system 108 may specifically target one or more of the utility customers 101-1a-101-1n and/or 101-2a-101-2n, and send personalized alert notifications using a unicast signal. The communication channels 115 may be configured to interface with a mothering device, such as any of monitoring devices 102-1a-102-1n, e.g., via smart meter, and/or a utility meter, such as, monitoring devices 102-2a-102-2n and/or a thermostat (e.g., climate control device 103-1n a customer's mobile device, a data exchange interface of a cellular network, and/or other networks.

In operation, energy usage alert system 100 allows for predicting whether or not utility customers will receive an unusual bill (e.g., a higher than expected bill) at the end of a billing cycle (or period) using a set of climate control disaggregation coefficients applied to a corresponding utility customer 101. For example, energy usage alert system 100 can calculate a projected energy use for a particular billing cycle, using the disaggregation coefficients for the utility customer 101, and based on the retrieved usage data for that utility customer. In response to the detection of an abnormally high energy use (and consequently a high bill), a usage alert communication can be sent to a client computing device associated with that utility customer, for example, if the projected use is determined to be greater than a previous billing period by a threshold amount. That is, usage alerts may be prevented (not sent) if the projected total consumption is below a predetermined threshold, for example, indicating that the customer's increased usage was not significant, or alternatively that the increased usage corresponded with expected changes in weather (e.g., particularly hot days).

In certain implementations, the usage alert communication may provide recommendations on how to reduce the utility bill for the remaining portion of the billing period, and/or provide information explaining possible causes for the projected high utility bill even if no smart meter data is obtainable from the utility customer site (e.g., monitoring device 102-2). That is, content of the usage alert may vary, depending on the targeted customer, and may provide various types of information to provide guidance on how to reduce a bill amount for the current period, as well as to educate the customer as to potential causes of the abnormally high power consumption.

Figure 2:
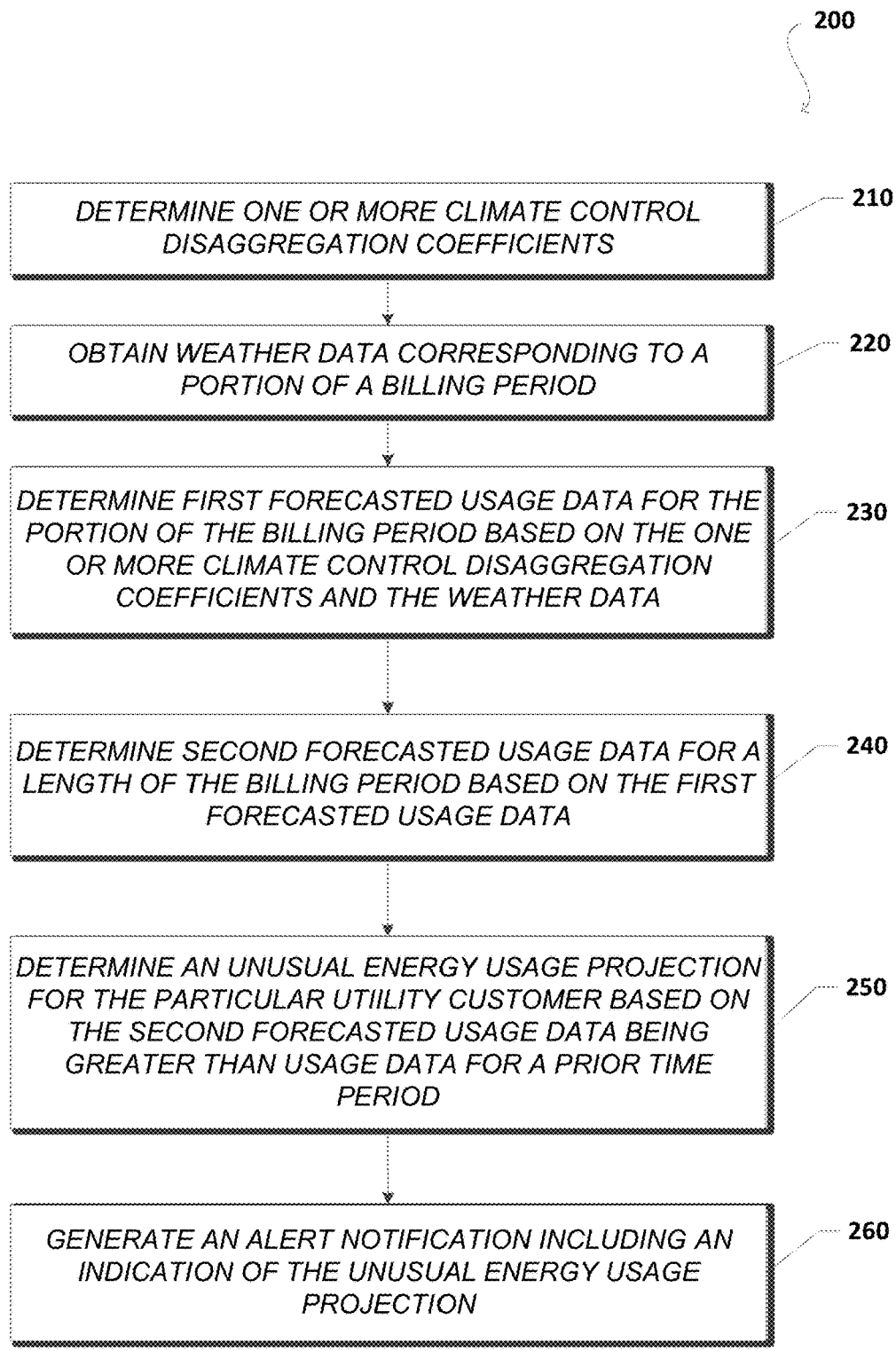
FIGS. 2-4 illustrate flowcharts of example processes for unusual usage alerts without smart meter data in the energy usage alert system described in FIG. 1, according to certain aspects of the technology.

FIG. 2 illustrates a flowchart of an example process 200 for energy usage alerts in the energy usage alert system described in FIG. 1, according to certain aspects of the subject technology. Process 200 is provided merely as an example and additional or fewer steps may be performed in a similar or alternative order, or in parallel, without departing from the scope of the technology.

Process 200 begins with step 210, in which a computing device (e.g., the billing management system 108) can determine a set of climate control coefficients (e.g., disaggregation coefficients) associated with energy consumption data for a particular customer/consumer. Because climate control disaggregation coefficients are determined using historic use data, some of the contextual examples discussed below describe the determination of climate control disaggregation coefficients for a particular utility customer, for example, with respect to the consumption of electric power. However, it is understood that any entity or consumer may be included. By way of example, disaggregation coefficients may be calculated for any type of "power consumer," which may describe various individuals, groups, organizations and/or physical buildings or locations where electric power is provided and/or consumed.

In some aspects, disaggregation coefficients are calculated using a series of historic use values (e.g., power consumption values), and their associated outdoor temperature values over a defined time period. For example, month-by-month home energy consumption values can be associated with outdoor temperature values (such as an average monthly temperature) for each corresponding home/building. It is understood that historic use values can represent power consumption measurements taken at various time intervals, such as on a per-billing-cycle, a month-by-month, week-by-week, or hour-by-hour basis.

Once a series of energy use values and outdoor temperature values are determined, a series of temperature difference values for the time period are determined based on differences in temperature between each of the outdoor temperature values and one or more baseline temperatures. Although some aspects are described as having one baseline temperature for both heating and cooling, in other aspects more baseline temperatures may be used (e.g., a heating baseline temperature and a cooling baseline temperature). In some aspects, the baseline temperature can be predetermined (chosen) as a temperature that is generally comfortable to humans (e.g., room temperature, or a customer's thermostat set point for heating/cooling). Thus, the baseline temperature can be chosen as having a value between 55° F. and 75° F. However, the baseline temperature can vary based on geography and user preferences, depending on the desired implementation.

Once the baseline temperature is determined, a series of cooling degree values and heating degree values are calculated. Cooling degree values can be calculated by subtracting the baseline temperature from outdoor temperatures that are above the baseline. Conversely, heating degree values are determined by subtracting outdoor temperatures (that are above the baseline), from the baseline temperature. The resulting heating/cooling degree values each correspond with an energy use value and outdoor temperature value, as discussed above.

Using the temperature difference values (i.e., heating degree values and/or cooling degree values), a regression analysis can be performed to determine one or more climate-control coefficients and a non-climate control coefficient. Climate-control coefficients are representative of climate-control related energy use. In contrast, a non-climate control coefficient is representative of non-climate control energy use, such as, energy used for entertainment, cooking and/or lighting, etc.

To determine climate control coefficients, the temperature difference values are plotted against the corresponding energy use values. Using an ordinary least squares regression analysis, the slopes of the resulting lines represent the respective climate control coefficients. That is, the line resulting from a graph of the heating degree values (as plotted against the energy use values), has a slope representing the climate control coefficient for the heating degree values. Likewise, a line resulting from a graph of the cooling degree values, as plotted against the energy use values, will have a slope representing the climate control coefficient for the cooling degree values.

In the above example, the non-climate control coefficient can be determined where the resulting lines cross the axis on which the energy use values are plotted, that is, where the temperature difference is zero (which may be either the vertical or horizontal axis, depending on the chosen graphical orientation). For example, when the respective home/building is not being heated or cooled (i.e., the temperature difference value is "0"), then the remaining energy usage is for non-climate related activities, indicating for example, energy use attributable activities other than heating/cooling of the building.

On the other hand, the cooling coefficient and heating coefficient are representative of the building's energy sensitivity with respect to changes in outside temperature. In other words, the cooling coefficient and heating coefficient model the amount of energy necessary to cool or heat the building given a particular outdoor temperature (e.g., a daily average outdoor temperature).

The non-climate control coefficient, cooling coefficient, and heating coefficient can be location specific (e.g., associated with a residence or building) and, therefore, calculated separately. Separate calculations for each coefficient (e.g., on a building-by-building) basis can also be performed because one building's sensitivity to outdoor temperature may be less than (or greater than) that of a different building. For example, one household may have an efficient HVAC system with well insulated walls and windows etc., whereas another household may have an outdated cooling and heating system with poor insulation. Furthermore, non-climate control energy use may vary between buildings.

Example processes for calculating a non-climate control coefficient, a cooling coefficient and a heating coefficient are disclosed by U.S. Patent Application Publication 2011/0106471, entitled "Method and System for Disaggregating Heating and Cooling Energy Use from Other Building Energy Use," filed Nov. 5, 2010, which is hereby incorporated by reference in its entirety.

Once the non-climate control coefficient, cooling coefficient, and heating coefficient are determined, they can be used to determine a climate control energy use and non-climate control energy use. The climate control energy use and a non-climate control energy use can be determined from a set of equations. For example, a total calculation of heating energy use can be calculated using equation 1, below:

$$\text{HeatingEnergyUse} = \text{HeatingCoefficient} * \text{sum}(\text{HeatingDegreeValues}) \quad (1)$$

Similarly, a total calculation of cooling energy use is given by equation 2, below:

$$\text{CoolingEnergyUse} = \text{CoolingCoefficient} * \text{sum}(\text{CoolingDegreeValues}) \quad (2)$$

As such, a calculation for the total climate control energy use can be determined by equation 3:

$$\text{ClimateControlEnergyUse} = \text{HeatingEnergyUse} + \text{CoolingEnergyUse} \quad (3)$$

That is, the heating energy use plus the cooling energy use is equal to the climate control energy use. As such, the non-climate control energy use can be calculated using equation 4.

$$\text{Non-climateControlEnergyUse} = \text{TimeInterval} * \text{Non-ClimateControlCoefficient} \quad (4)$$

In the above example, the climate control coefficient includes both a cooling coefficient and a heating coefficient. In other aspects, however, the climate control coefficient may include only a heating coefficient or only a cooling coefficient. For example, in some cases, there may only be a cooling coefficient because there are no heating degree values. In such cases, the heating coefficient would have a value of "0."

In step 220, the computing device can obtain, for example, from a third party service provider, weather data corresponding to at least a portion of a billing period. The computing device may obtain the weather information from the third party service provider (e.g., International Weather Service) via an application programming interface (API). Information from the third party service provider may be latitude/longitude based. In some aspects, the weather information may be obtained from cached results of neighboring service provider sites (e.g., weather stations) such that requests from a client computing device for sites in proximity of one another can be served by the same cached results. In an aspect, the computing device obtains weather data from a data structure containing weather conditions for specified times and corresponding geographic locations.

In step 230, the computing device can determine an energy use for a previous time period, for example, within the current billing period (e.g., "first forecasted usage data"). That is, the first forecasted usage data provides an indication of the amount (or cost) of current energy, i.e., a period-to-date usage.

In this example, the first forecasted usage data can be determined using an expression defined as:

period_to_date_days*$\text{coefficient}_{base\text{-}load}$+
  period_to_date_cooling_degree_days*
  $\text{coefficient}_{cooling}$+
  period_to_date_heating_degree_days*$\text{coefficient}_{heating}$.

In the above expression, the period_to_date_cooling_degree_days represents a summation of a series of temperature difference values for days in the previous time period in which the temperature was higher than the baseline temperature. Similarly, the period_to_date_heating_degree_days, corresponds with a summation of a series of temperature difference values for days in the previous time period in which the temperature was lower than the corresponding baseline. The $\text{coefficient}_{base\text{-}load}$ represents the base-load coefficient, the $\text{coefficient}_{cooling}$ is the cooling coefficient, and the $\text{coefficient}_{heating}$ is the heating coefficient.

In step 240, the computing device can determine second forecasted usage data, representing an expected amount of energy consumption for some future time period, e.g., the time period spanning a remaining portion of a current billing period. In some aspects, the second forecasted usage data can be determined based on a scaling of the first forecasted usage data, discussed above. For example, if the first forecasted usage data provides a consumption estimate for the first ¼ of a current billing period, the second forecasted usage data may be calculated by scaling the first forecasted usage data (e.g., the second forecasted usage data may be estimated to be three times the first forecasted usage data amount).

The second forecasted usage data may be expressed as a monetary value or an amount of energy used for the billing period. Furthermore, the second forecasted usage data may be related to the cost or amount of energy used by a property and/or the cost or amount of energy used by one (or more) energy consumption components (e.g., an appliance, an HVAC system, electric-vehicle, etc.) of the property.

Depending on implementation, the second forecasted usage data may be based on the first forecasted usage data being scaled by an expected number of days remaining in the billing period. Further to the above example, the first forecasted usage may be calculated on a day-by-day basis. As such, the second forecasted usage may be calculated by scaling the first forecasted usage based on a number of days remaining in the billing period. For example, if the remaining billing period is twice as long as the time period for the first forecasted usage estimation, the second forecasted usage data may represent a power usage estimate that is twice as large as that of the first forecasted usage data.

In an alternative embodiment, the second forecasted usage may be based on weather forecast information for the associated time period, i.e., a future time period or a remaining duration of a current billing cycle. That is, weather forecast data for a future time period may be used to determine temperature difference estimates for each remaining day in the time period. Using these temperature difference estimates, as well as previously calculated cooling/heating coefficients, second forecast data can be calculated, as discussed above.

In step 250, the computing device can perform operations to determine an unusual energy usage projection for the particular utility customer, for example, based on the second forecasted usage data. In some implementations, the second forecasted usage data may be considered unusual (e.g., unusually high) if the projected energy use exceeds a predetermined threshold consumption amount (e.g., 30% more than the utility customer's average consumption amount of the past 3 billing cycles, 15% more than an average consumption amount for similar users, etc.). In other implementations, the second forecasted usage data may indicate an unusually high consumption if the second forecasted usage exceeds consumption for a previous, but comparable, time period (e.g., the same period in a preceding year or billing cycle).

In some aspects, forecasted weather conditions may also be taken into account when determining if a forecasted usage is to be considered unusual. For example, if weather changes warrant additional energy expenditure (e.g., on either heating or cooling), then the forecasted usage may not be considered to be 'unusual' even if the energy usage is higher than for a previous, but comparable, time period.

In some aspects, the computing device can apply a rate structure to the second forecasted usage data to determine a forecasted bill amount corresponding to the length of the billing period. That is, a cost rate for each unit of energy (e.g., kW/h) may be multiplied by the total estimated usage (e.g., based on the second forecasted usage data). As such, a forecasted bill amount can be determined, for example, by performing a similar calculation for energy already consumed (e.g., for a prevision fraction of the billing period) and combining the cost with an cost estimated based on total estimated usage, as discussed above. The unusual energy usage projection for the particular utility customer is based at least in part on the forecasted bill amount being greater than a bill amount for the prior time period.

In step 260, the computing device can generate an alert notification, including an indication of the unusual energy usage projection, and send the alert notification to the particular utility customer. In this respect, the unusual energy usage projection can relate to a likelihood that the particular utility customer is projected to receive a utility bill that is higher than expected. For example, if the current forecasted usage or billed amount is more than the same period in a previous time period (plus some specified margin or threshold amount), then an alert is sent to the customer to indicate that they are on track for an unusually high utility bill.

In certain aspects, the computing device may provide recommendations in the alert notification regarding how to modify usage so that the projected bill amount will fall within the expectations of the customer for the billing period. Recommendations may include set points or set point schedules that can be used on the climate control device, such as a smart thermostat, to reduce usage. For example, using thermodynamic modeling and/or hourly or daily weather forecast data, the HVAC runtime based on a current thermostat setting can be determined including how much the HVAC runtime can be curtailed using a new set of set point schedules. Other techniques for providing recommended set points include (a) a rule-based suggestion, such as, a suggestion to move one or more set points to be incrementally (e.g., 1 or 2 degrees) more efficient, or making the number of degrees suggested to be proportional to a "projected remaining use" and (b) using linear regression or a similar scheme that predicts a number of degrees to alter a set point schedule, for example, based on past usage.

Other recommendations may be directed to other energy usage components on the property (e.g., time shifting washer/dryer usage, turning off lights, closing/opening windows when outside conditions satisfy certain characteristics, etc.). According to some implementations, the computing device may automatically adjust settings on the thermostat to modify usage so that actual usage can remain within the budgeted use for the specified budget period.

In view of the process 200, consider the following fact scenario:

(a) Customer base-load coefficient: 21.2 kwh/day
(b) Customer cooling degree day coefficient: 1.93 kwh/cdd/day
(c) Customer heating degree day coefficient: 0.51 kwh/hdd/day
(d) Days into billing period: 11
(e) Expected length of billing period: 30 days
(f) Cooling degree days in billing period (sum of number of degrees below a cooling temperature threshold, e.g., 65 degrees F.): 247
(g) Heating degree days in billing period (sum of number of degrees above a heating temperature threshold): 0
(h) Forecasted usage to date: (a)*(d)+(b)*(f)/(d)+(c)*(g)/(d)=21.2*11+1.93*247/11+0.51*0/11=277 kwh
(i) Forecasted usage at end of billing period: 277 kwh/11 days*30 days=754 kwh One alternative embodiment uses both retrospective (described above with respect to FIG. 2) and prospective weather data, as will be discussed in FIG. 3. In this example, the energy consumption to date would be calculated as described above. Rather than simply scaling this value up by the number of days left in the billing period, the embodiment would use forecasted weather conditions and the same disaggregation coefficients to predict energy consumption through the end of the billing period. The same logic can be used for deciding whether to deliver an alert to a customer after a forecast was made. In another alternative embodiment, prospective weather data may be used to predict energy consumption for a billing period (with or without the use of retrospective weather data). Accordingly, unusual usage projection may be determined even before a billing period begins.

Figure 3:
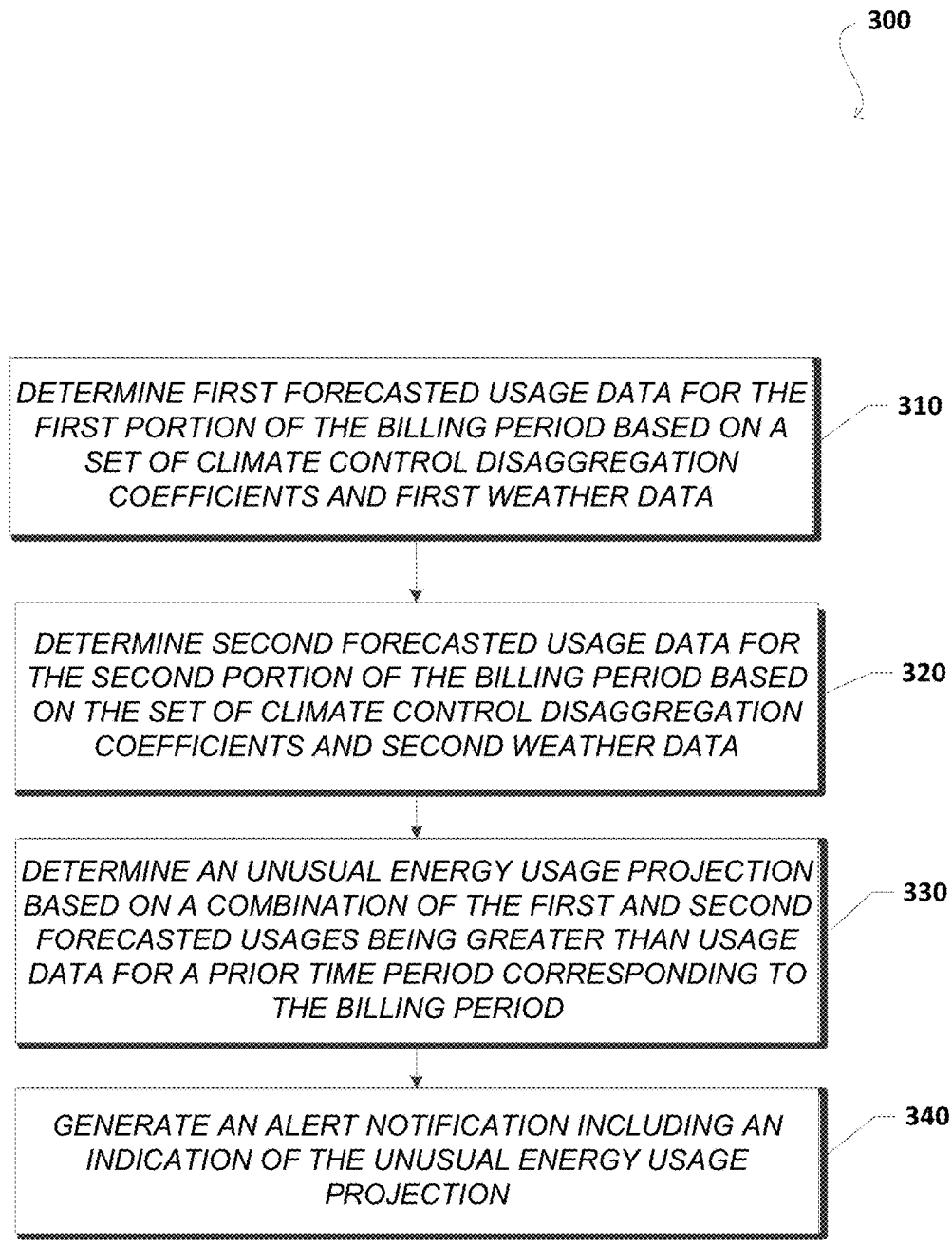

FIG. 3 illustrates a flowchart of an example process 300 for generating energy usage alerts in the energy usage alert system described in FIG. 1. The example process 300 is provided as an example and additional or fewer steps may be performed, in similar or alternative orders, or in parallel, without departing from the scope of this specification.

In step 310, the computing device can determine a first forecasted usage for a first portion of a billing period, based on a set of climate control disaggregation coefficients and first weather data (e.g., known weather data for a previous portion of the billing period). Additionally, the computing device can determine the first weather data corresponding to the first portion of the billing period.

In step 320, the computing device can determine a second forecasted usage for a second portion of the billing period, based on the set of climate control disaggregation coefficients and the second weather data, e.g., that is provided by a weather forecast and, for example, received from a third-party service using API. In this example, the second portion is subsequent in time to the first portion. The computing device can determine (receive) the second weather data corresponding to the second portion of the billing period (i.e., the remaining portion of the billing period). The first weather data may be different from the second weather data.

In step 330, the computing device can determine an unusual energy usage projection for the particular utility customer, based at least in part on a combination of the first forecasted usage and the second forecasted usage being greater than usage data for a prior time period corresponding to the billing period.

In step 340, the computing device can generate an alert notification including an indication of the unusual energy usage projection. In this example, the alert notification may be sent to the utility customer prior to the end of the billing period.

Consider the same fact scenario above, but with the following additional data:

(j) Forecast remaining days in billing period: 19
(k) Forecast cooling degree days in billing period: 428
(l) Forecast heating degree days in billing period: 0

Forecast energy usage at end of billing period: $(h)+(a)*(j)+(b)*(k)/(j)+(c)*(l)/(j)=277+21.2*19+1.93*428/19+0.51*0/19=446$ kwh Another alternative embodiment would compare the results of the approach discussed in FIG. 3 or FIG. 2 with a bill forecast created using smart meter data as will be discussed in FIG. 4. While the smart meter data can provide a more accurate bill prediction, it may not explain why a utility customer's usage might be high.

By way of example, if both the smart meter bill forecast and billing data+weather bill forecast indicated a high bill, the likely root cause was extreme weather. That is, high billing predictions that are based on abnormal weather data (or estimates), may indicate a higher usage (as compared to a previous reference usage amount); however, the forecasted usage amount may not be considered to be unusually high, given the predictable increase in energy consumption due to extreme cold/hot conditions.

Alternatively, if the billing data+weather bill forecast did not indicate a high bill, but the smart meter bill forecast did indicate a high bill, it could be deduced that the high usage was a result of something other than weather/climate control (e.g. a guest staying in the home). In some aspects, this intelligence can be used to improve upon the high usage alert delivered to the customer, for example, by providing the utility customer a potential explanation for the high bill, and more targeted tips.

Figure 4:
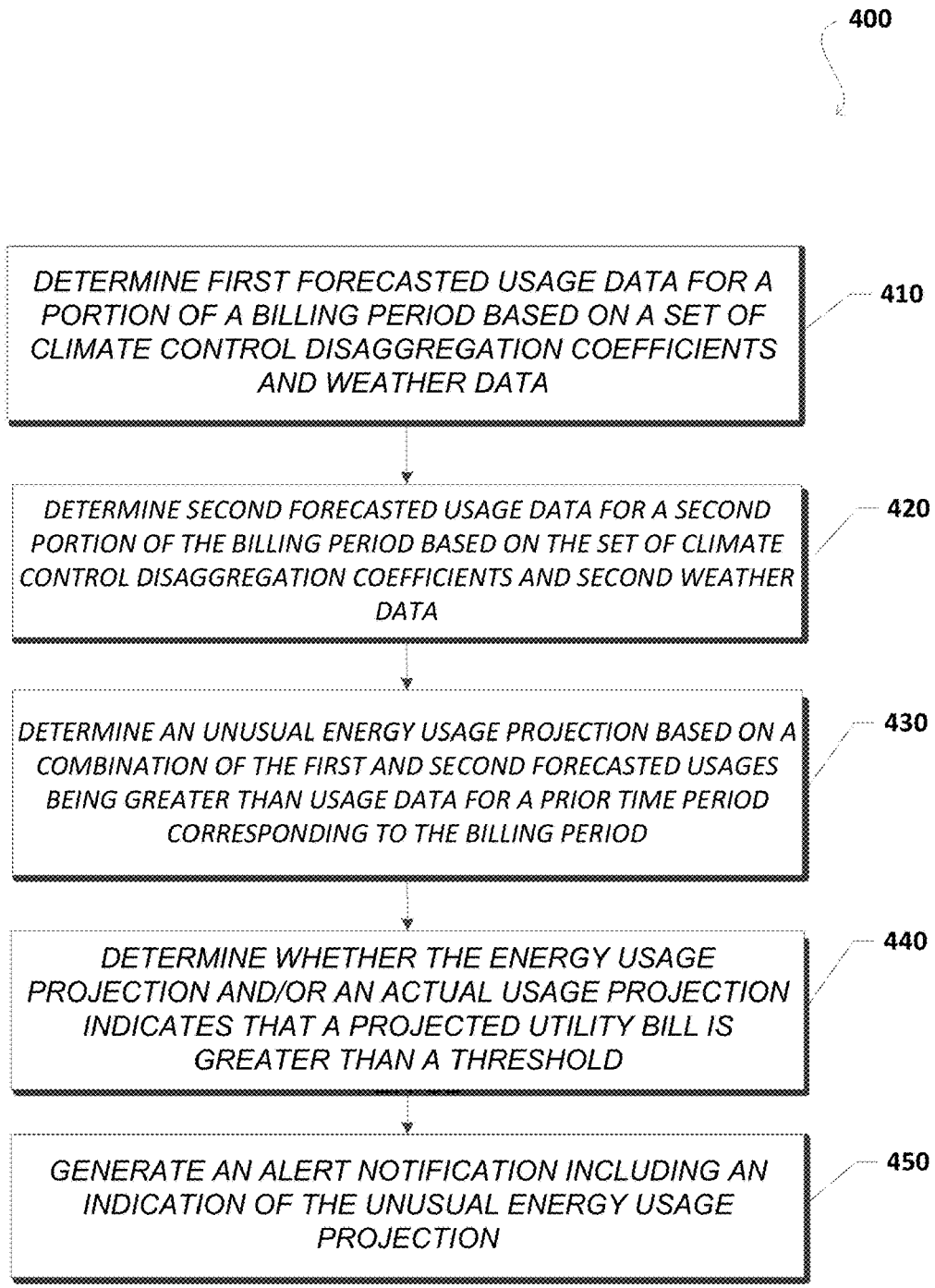

FIG. 4 illustrates a flowchart of an example process 400 for energy usage alerts in the energy usage alert system described in FIG. 1, according to certain aspects of the subject technology. Process 400 is provided as an example, however, additional or fewer steps may be performed in similar or alternative orders, or in parallel, without departing from the scope of this specification. In particular, the process of FIG. 4 discloses how an energy use projection calculation can be performed using actual usage data from a current billing period, for example, that is collected using a smart meter configured to provide AMI data.

In step 410, the computing device can determine first forecasted usage data for a portion of a billing period, for example, based on a set of climate control disaggregation coefficients, weather data, and/or actual usage data for at least a portion of the first portion of the billing period. The set of climate control disaggregation coefficients may be associated with energy consumption data of a commodity for a particular utility customer and/or with a specific location (e.g., building or residence). The set of climate control disaggregation coefficients can include coefficients relating to a rate of energy consumption for a corresponding type of climate control. The computing device can obtain, for example, from at least one third party service provider, weather data corresponding to at least a portion of the billing period.

In step 420, the computing device can determine second forecasted usage data for a length of the billing period based at least in part on the first forecasted usage data. In some aspects, weather forecast information (e.g., for a number of future days) can be used to determine the second forecasted usage data.

In step 430, the computing device can determine an actual usage projection for the utility customer. In some aspects, the actual usage projection is based on smart meter data, such as, AMI data reflecting power use for one or more days of the current billing period. In this example, the unusual energy usage projection is indicative of the utility customer projected to receive a high utility bill.

In step 440, the computing device can determine that the actual usage projection indicates that an upcoming utility bill for the particular utility customer is greater than a threshold (i.e., that the actual usage projection is considered to be 'unusual energy use'). The actual usage projection is data based on smart meter data collected, for example, using an AMI metering infrastructure. In this example, the threshold can be a predetermined amount (e.g., indicated as a percentage increase in the total bill amount). Alternatively, the threshold may be a predefined user configurable value set by the utility customer to trigger an alert. The threshold value may be indicated as a monetary value or an energy amount, depending on implementation.

An actual usage projection can relate to actual usage data of a current billing cycle, as opposed to historic data from previous periods. Actual usage projections can be based on scaled projections for actual usage data from the current period. For example, in a 30 day period in which actual usage data is available for the first 10 days, an actual usage projection may be equivalent to the energy consumption for the first 10 days, scaled by a factor of 3.

In step 450, the computing device can generate an alert notification including an indication of the unusual energy usage projection. The indication can include information relating to a cause for an increase in the utility bill based on the unusual energy usage projection. For example, if it is determined that the unusual energy usage projection is due to abnormal weather (e.g., either unusually hot or cold weather), then the cause (weather) may be provided to the customer as a reason for the unusual high energy consumption amount. Alternatively, if the weather conditions are not abnormal, various energy conservation tips may be provided to help the customer to lower their projected usage consumption. By way of example, recommended thermostat set points may be indicated, which would enable the user to reduce his/her energy consumption for a remaining portion of the current billing period.

Figure 5A:
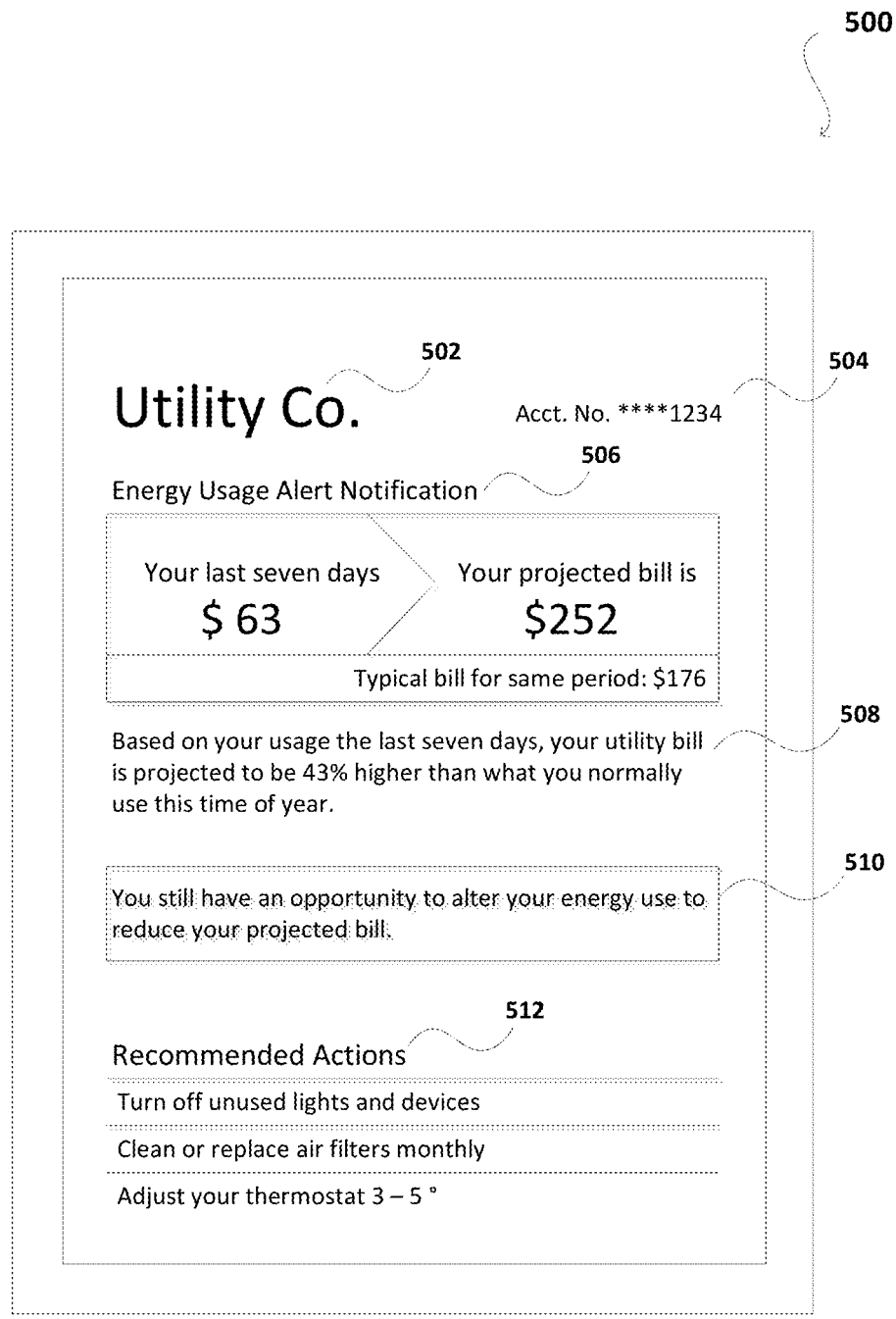
FIGS. 5A-5C illustrates examples of energy usage alert notifications, according to certain aspects of the technology.
Figure 5B:
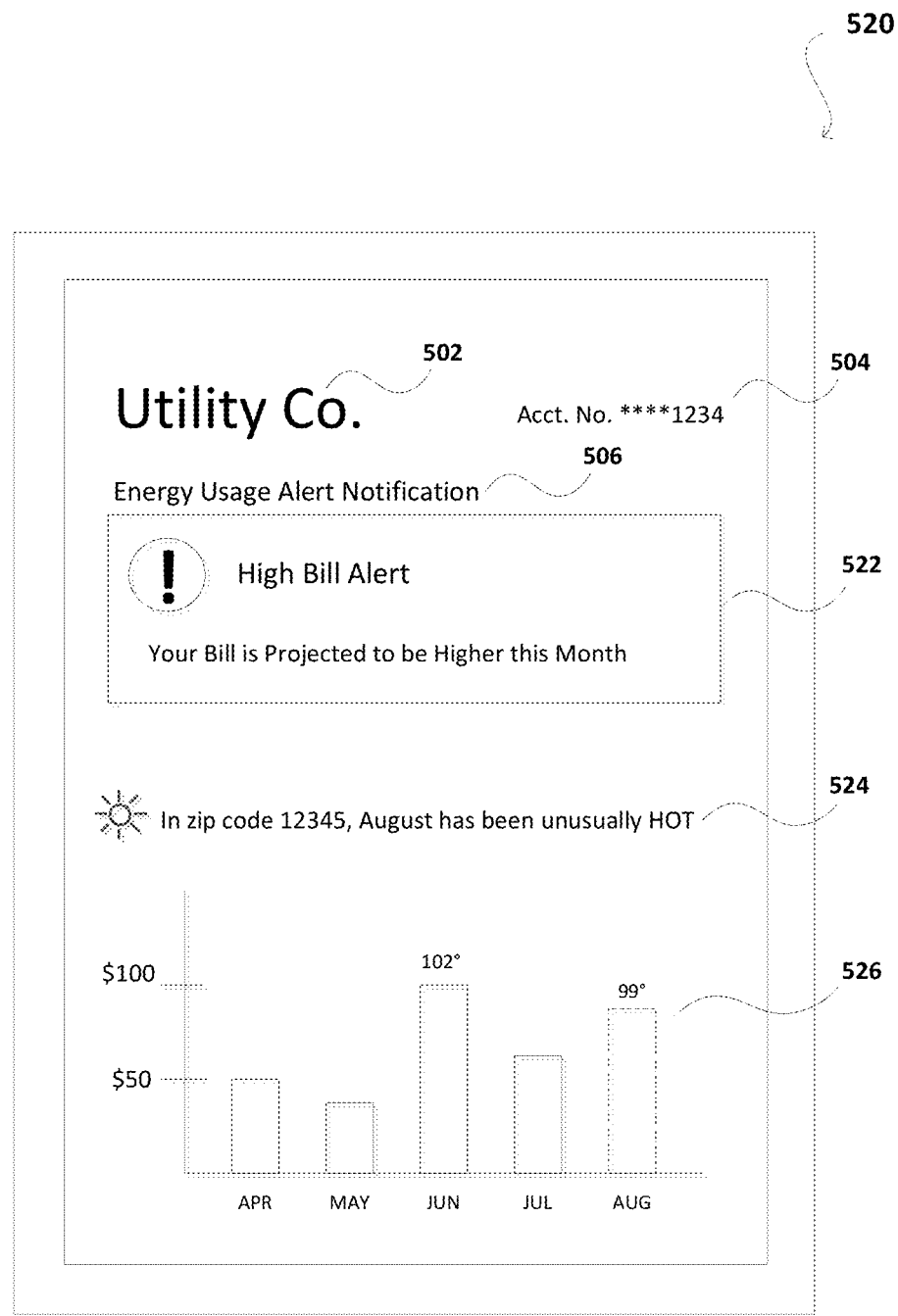
Figure 5C:
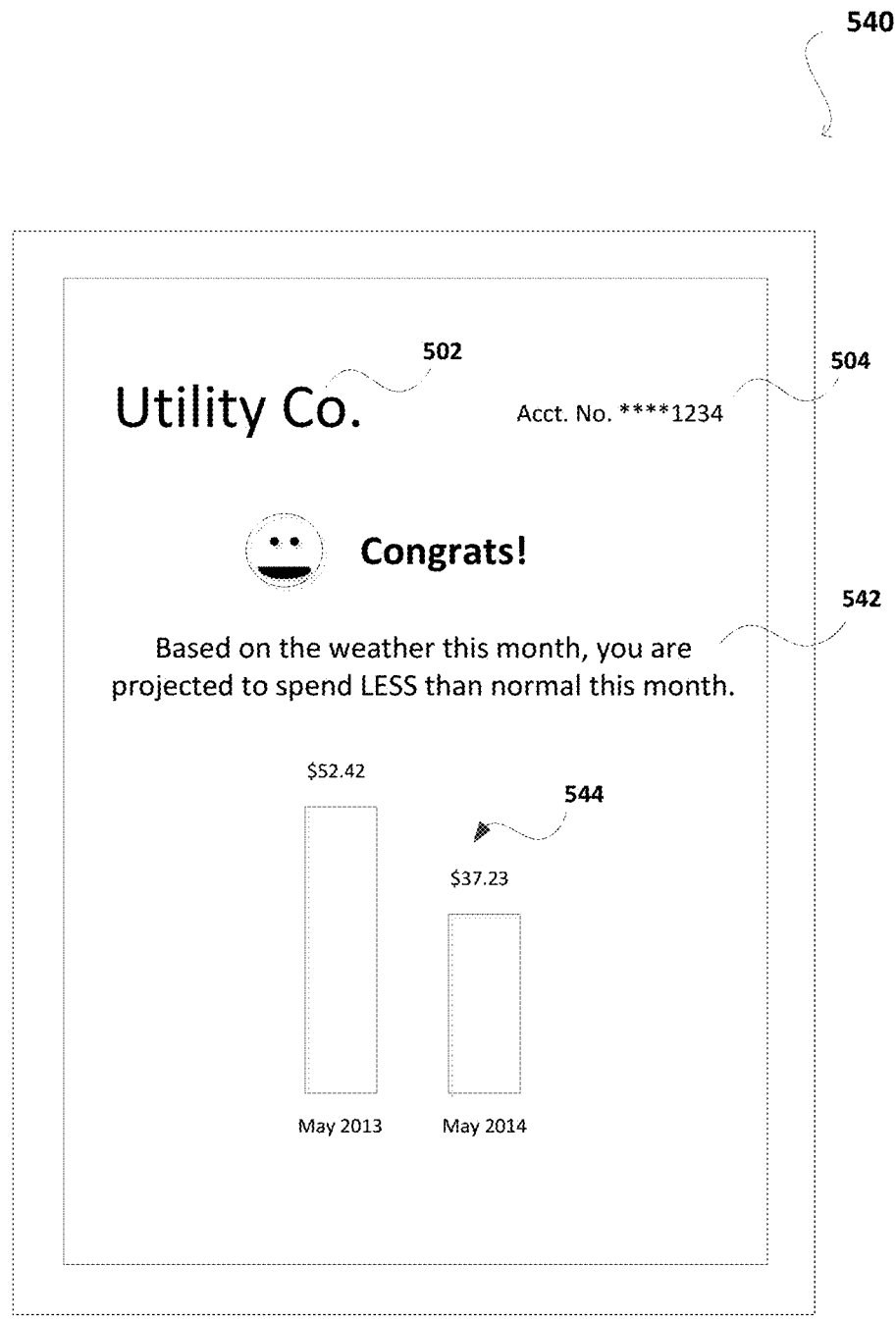

FIGS. 5A-5C illustrates examples of energy usage alert notifications, according to certain aspects of the subject technology. In FIG. 5A, an example of an energy usage alert notification 500 is illustrated. Energy usage alert notification 500 includes utility identifier 502, account number 504, alert title 506, report analysis 508, report message 510, and recommendation portion 512. Energy usage alert notification 500 is provided merely as an example and additional or fewer features may be included in similar or alternative formats within the scope of the various embodiments described in this specification.

Utility identifier 502 may relate to the utility company associated with the generation of the energy usage alert notification 500. Utility identifier 502 may include a name of the utility company, an address for the utility company, and/or contact information for the utility company.

The account number 504 may relate to the corresponding utility customer subscribed to receive energy usage alerts such as the energy usage alert notification 500. For privacy reasons, account number 504 may be limited to a subset of numbers that, at least in part, identify the utility account without including any personal or identifying information of the account holder. In an aspect, account number 504 is displayed in its entirety.

The alert title 506 provides an identification of the type of notification contained in the energy usage alert notification 500. For example, the alert title 506 may relate to a power conservation alert where the notification 500 provides the utility customer an indication on how to save energy and/or money for the current billing period. In this example, the energy usage alert notification 500 may be sent to the utility customer before the end of the current billing period to allow the utility customer sufficient time to make adjustments to current climate control settings of the corresponding property. Energy usage alert notification 500 may be generated and sent to the utility customer before the end of the billing period even if usage interval data is not available for the site of the utility customer using the approaches discussed in FIGS. 2-4.

The report analysis 508 may include information relating to how the current projected bill compares to prior utility bills, and may include a metric to give the utility customer some context to the current projected bill. The report analysis 508 may include additional metrics such as a chart to provide the utility customer a visual analysis of the current projected bill.

The report message 510 may include an indication to the utility customer that the projected bill can still be altered if certain adjustments are made prior to the end of the current billing period. The report message 510 also may include other report messages relating to the current projected bill such as usage information relating to specific components of the property and/or rate information over the duration of the specified billing period.

The recommendation portion 512 may include recommendations on how to modify usage so that actual usage can remain within a desired monetary range for the specified billing period. The recommendations may include set points or set point schedules that may be used on the climate control device, such as, suggestions to turn off light sources and/or electronic devices, maintenance suggestions, and specific adjustments to the climate control device.

In FIG. 5B, an example of an energy usage alert notification 520 is illustrated. The energy usage alert notification 520 includes a utility identifier 502, an account number 504, an alert title 506, an alert message 522, a geo-based climate message 524, and a comparison chart 526.

The alert message 522 includes an indication to the utility customer that the utility bill for the specified billing period is projected to be higher than expected. In this example, the projection may indicate that the cost of energy consumption is higher for a current billing period compared to the same calendar period of a prior year. The alert message 522 can include one or more icons and/or symbols representing an alert to the utility customer. In some aspects, the alert message 522 includes an indication of recommended steps to reduce the projected energy cost prior to the end of the specified billing period.

The geo-based climate message 524 includes information relating to the climate of a corresponding location (e.g., zip code) compared to a historical average for that location. In some aspects, the geo-based climate message 524 includes an indication of whether the climate for the specified billing period is cooler or hotter than the historical average. In this example, the geo-based climate message 524 indicates that the climate of the specified billing period (e.g. month of August) is hotter than normal. In this respect, any increase in energy consumption for the specified billing period is likely correlated to an increase in temperature for the corresponding location.

The comparison chart 526 includes a two-dimensional chart including information relating to a trend of the cost for energy consumption over a specified calendar range. In this example, the x-axis indicates a number of months for the specified calendar range and the y-axis indicates a cost range for the energy consumption. For example, the month of June experienced an average of high temperatures that translated to a cost $100. Similarly, the month of August experienced higher than normal temperatures, which is projected to cost the utility customer about $99. In this regard, the projected cost is likely due to the increasing temperatures for the month of August.

In FIG. 5C, an example of an energy usage alert notification 540 is illustrated. The energy usage alert notification 540 includes a utility identifier 502, an account number 504, an alert message 542, and a comparison chart 544.

The alert message 542 includes an indication to the utility customer that the utility bill for the specified billing period is projected to be lower compared to the same period in prior years. In this example, the projection may indicate that the cost of energy consumption is likely to be lower for a current billing period due to the weather forecasted to be cooler to thereby avoid a need to cool down the property of the utility customer. The alert message 542 can include one or more icons and/or symbols with a corresponding notification. In some aspects, the alert message 542 includes an indication of how much energy is being saved from consumption or how much in monetary value is projected to be saved in the utility bill.

The comparison chart 544 includes two-dimensional charts indicating a cost in energy consumption for two different calendar periods. In this example, the cost in energy consumption for a specified period (e.g., May) in a prior year (2013) is greater than the cost projected for the same period in the specified billing period (May 2014). In some aspects, the comparison chart 544 includes the comparison in terms of the amount of energy (e.g., 156 kWh versus 103 kWh).

The subject technology allows for identifying customers whose energy consumption is particularly sensitive to weather, and use hourly or daily weather data as a proxy for energy consumption data that is collected monthly. In this regard, the subject technology relies on customer specific sensitivity to weather conditions to decide whether or not an alert should be delivered. It would be trivial to deliver alerts to all customers after several days of especially cold or hot weather, but there would be many false positives in that case as utility customers whose consumption is not correlated with temperatures would not be more likely to have an abnormal bill.

Figure 6:
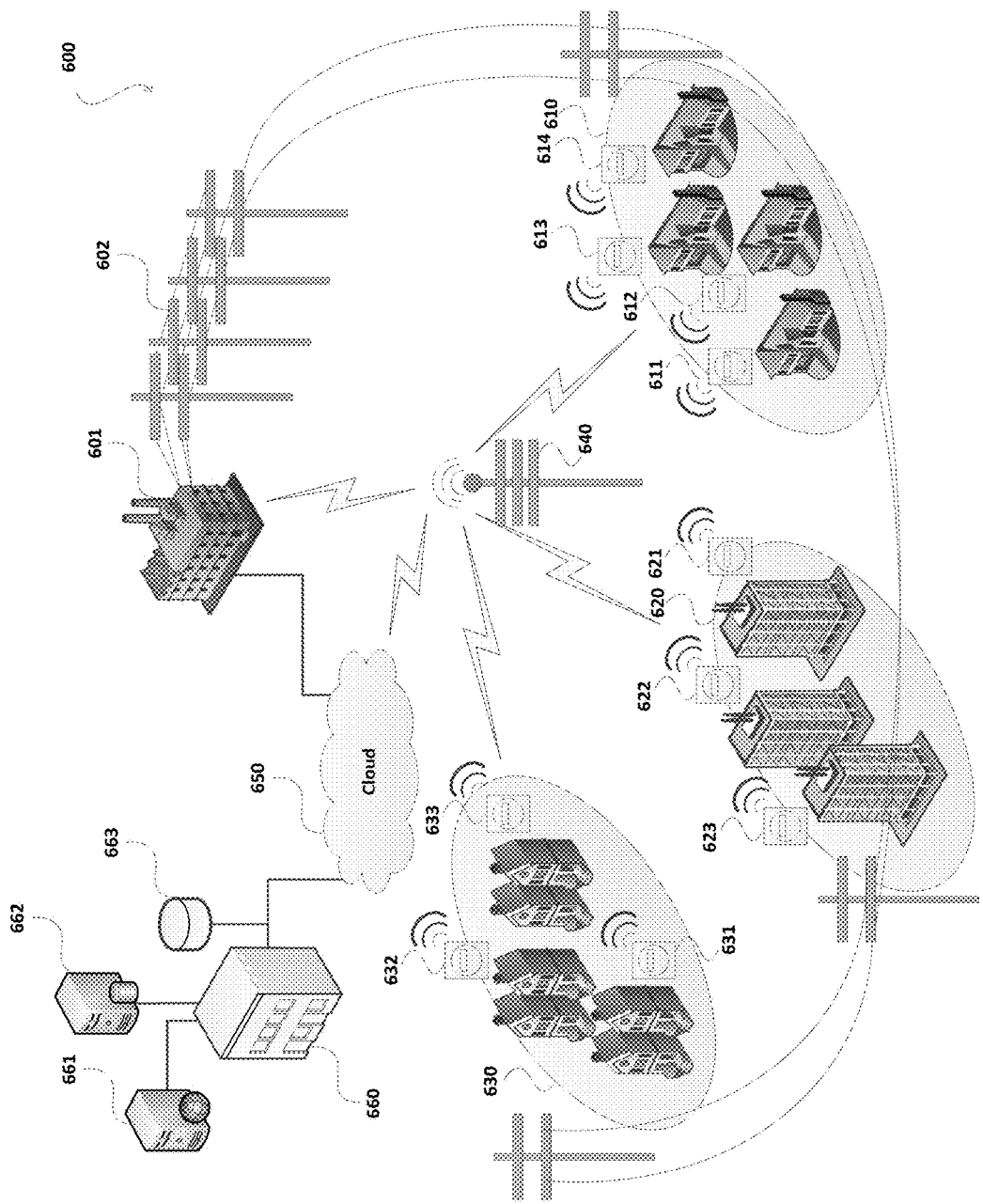
FIG. 6 illustrates an example of an environment for implementing aspects of the technology.

FIG. 6 illustrates an example of an environment 600 for implementing aspects in accordance with various embodiments. Environment 600 includes utility company 601, power distribution system 602, utility customer regions 610, 620 and 630, energy usage collector 640, network 650 and usage alert system 660. The utility customer region 610 includes residential structures with corresponding smart meters 611-614. The utility customer region 620 includes commercial structures with corresponding smart meters 621-623. The utility customer region 630 includes multi-family structures with corresponding smart meters 631-633. The usage alert system 660 includes a web server 661, an application server 662 and a database 663.

Utility company 601 provides a commodity (e.g., electricity, gas, water) to utility customer regions 610, 620 and 630, and can track the energy usage from each region via a monitoring device (e.g., a meter) associated with each structure of the corresponding region. The utility company 601 may receive usage data that includes the amount of energy consumption (e.g., kWh) for the corresponding utility account. In an aspect, the utility company 601 receives the usage data from the energy usage collector 640 via a wireless communication system. In some aspects, the energy usage collector 640 may obtain the usage data by pulling the usage data from each of the metering devices, or the usage data may be collected manually by regular meter readings, for example, on a monthly, weekly or bi-weekly basis. The utility company 601 also may receive the usage data from each monitoring device through a wired communication system.

The usage alert system 660 is in communication with the utility company 601 via the network 650. The usage alert system 660 may obtain the usage data from the utility company 601 via the network 650. In an aspect, usage alert system 660 receives the usage data via the network 650. The usage alert system 660 may receive the usage data directly from the meter devices.

Each of the utility customer regions 610, 620 and 630 may correspond to a separate geographical location with a respective rate schedule. In some aspects, an energy usage alert notification for a corresponding utility customer in one region may be generated using usage data for similar users in the same (or a similar) region to provide the corresponding utility customer with a comparative analysis of its energy consumption (e.g., current energy usage compared to similar customers in the same zip code or within a certain radius).

The usage alert system 660 also may be in communication with a third party weather service, such as the National Weather Service (not shown). For example, usage alert system 660 may receive corresponding outdoor temperatures from the third party weather service via the network 650 (e.g., e-mails, downloaded FTP files, and XML feeds). In this respect, usage alert system 660 may use data from the third party weather service to determine a projected use for a current billing period. For example, forecasted weather conditions (e.g., the temperature, the humidity, the barometric pressure, precipitation, etc.) may indicate that the utility customer's HVAC system is likely to be in greater use. The usage alert system 660 may estimate the projected use for the remaining amount of time of the current billing period, and thereby determine if the utility customer is on pace to exceed the projected bill based on the estimated projected use. In turn, usage alert system 660 may notify the utility customer through an energy usage alert notification.

Usage alert system 660 communicates the energy usage alert notification to utility customers associated with the utility customer regions 610, 620 and 630. In some aspects, usage alert system 660 communicates the energy usage alert notification via network 650. For example, usage alert system 660 may send the energy usage alert notification in an e-mail or the utility customer may log into usage alert system 660 (e.g., the web server 661 and/or application server 662) through an associated website to view the disaggregated usage data included in the energy usage alert notification. The usage alert system 660 may send the energy usage information to a printing system so that the energy usage alert notification can be provided to the utility customer via regular mail (e.g., as part of a utility bill). In other aspects, the energy usage information is communicated back to the utility company 601 such that the utility company 601 can provide the energy usage alert notification to the utility customer.

Figure 7:
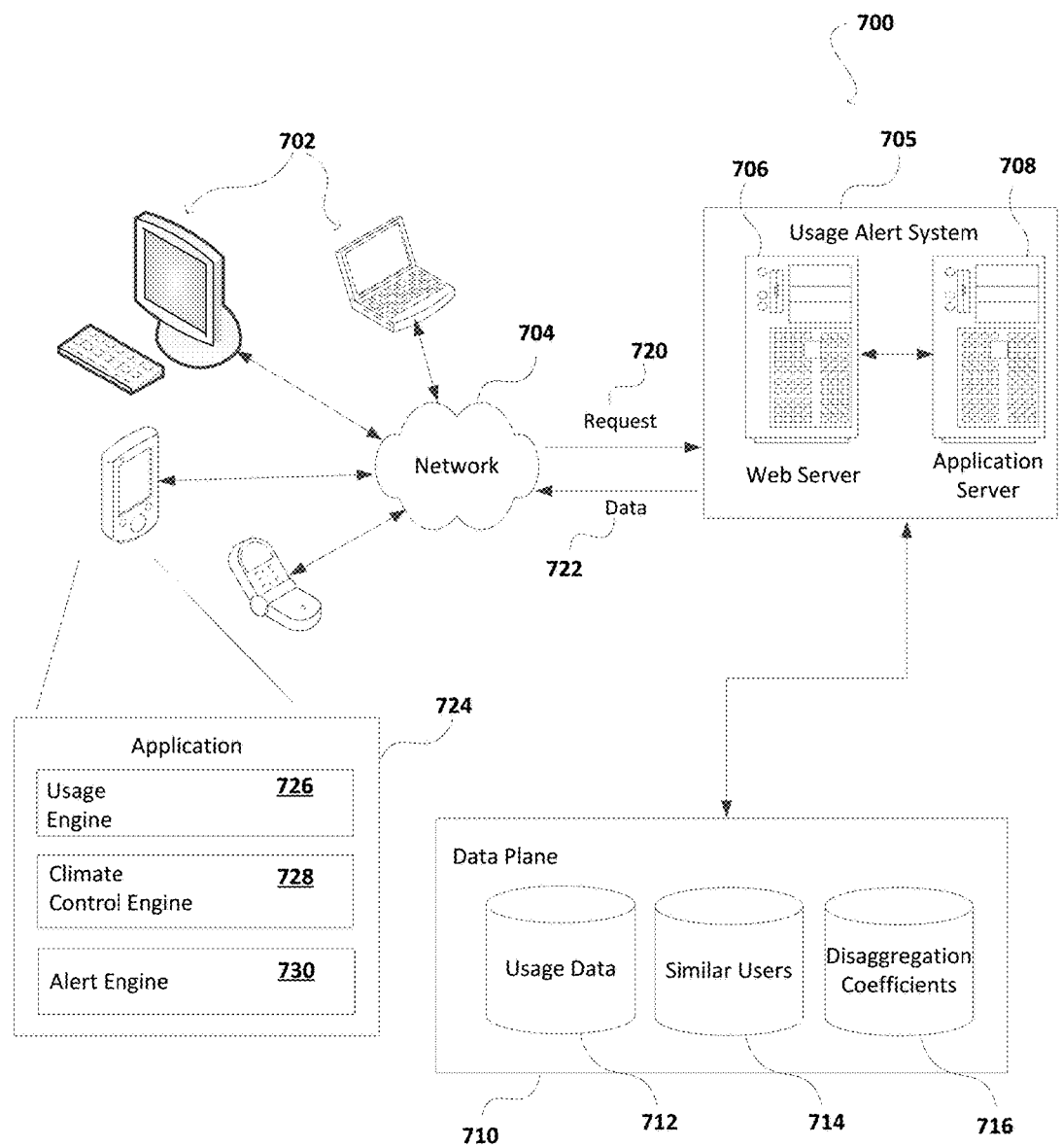
FIG. 7 illustrates an example of a system for energy usage alerts, according to certain aspects of the technology.

FIG. 7 illustrates an example of a system 700 for energy usage alerts, according to certain aspects of the subject technology. Although a web-based environment is described for purposes of explanation, different environments may be used, as appropriate, to implement various embodiments.

The example system 700 includes a usage alert system 705 and a data plane 710. The usage alert system 705 includes at least one web server 706 and at least one application server 708, as described below. The usage alert system 705 is an example of an energy usage notification system implemented as computer programs on one or more computers in one or more locations, in which the systems, components, and techniques described below can be implemented.

A user can interact with the usage alert system 705 through a client device 702. For example, the client device 702 can be a computer coupled to the usage alert system 705 through a data communication network 704, e.g., the Internet. In some instances, the usage alert system 705 can be implemented on the client device 702, for example, through a software application executing on the client device 702. The client device 702 generally includes a memory, e.g., a random access memory (RAM), for storing instructions and data, and a processor for executing stored instructions. The client device 702 can be any appropriate device operable to send and receive requests, messages, or other types of information over the data communication network 704. The client device 702 can also include a display screen though which the user interacting with the client device 702 can view information, e.g., energy usage alert notification 300 of FIG. 3. Some examples of client devices include personal computers, smart thermostats, cellular phones, handheld messaging devices, laptop computers, set-top boxes, personal data assistants, electronic book readers, tablet devices, smartphones and the like.

The data communication network 704 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 702 can communicate over the data communication network 704 using wired or wireless connections, and combinations thereof.

A user can use the client device 702 to submit a request 720 to log into the usage alert system 705. The request 720 can request a digital copy of an energy usage alert notification for a corresponding utility account. The energy usage alert notification may include information relating to how much energy has been consumed to date and/or a projected bill amount for a current billing period. The usage alert notification also can include information relating to one or more recommendations for adjusting settings in the property associated with the corresponding utility account such that the projected bill is kept below a target budget for the current billing period. When the user submits the request 720, the request 720 may be transmitted through the data communication network 704 to the application server 708 within the usage alert system 705. The application server 708 responds to the request 720 by using, for example, usage data 712, to identify data 722 describing an energy usage alert with personalized information in response to the request 720. The application server 708 sends the data 722 through the data communication network 704 to the client device 702 for presentation to the user.

The data 722 can include data describing a projected bill for a current billing period. The data 722 can be used, for example, by the client device 702, to generate a local energy usage alert notification with one or more interactive features such as energy consumption adjustments with corresponding utility bill projections and/or instructions for adjusting settings on a climate control device associated with the corresponding utility customer.

After receiving the data 722 from the application server 708, and through the data communication network 704, a software application, e.g., web browser or application 724, running on the client device 702 renders an interactive energy usage alert notification using the data 722. For example, a usage engine 726 in the application 724 can describe the usage to date including a projected use for the current billing period, for display on a display screen of the client device 702.

In some aspects, the application 724 includes a climate control engine 728 that is configured to render an interface to the climate control device, and perform one or more actions related to the instructions for adjusting the settings of the climate control device. In some embodiments, the climate control engine 728 is configured to obtain data relating to current settings of the climate control device. The climate control engine 728 can obtain real-time statistics and/or sensor readings (e.g., thermometer reading) of current climate conditions in the property. In an aspect, the application 724 includes an alert engine 730 that is configured to render the energy usage alert notification including allow the user to set (or program) rules and/or conditions for receiving the energy usage alert notification.

In some embodiments, the web server 706, the application server 708, and similar components, can be considered to be part of the data plane 710. The handling of all requests and responses, as well as the delivery of content between the client device 702 and the application server 708, can be handled by the web server 706. The web server 706 and the application server 708 are merely example components. However, more or fewer components can be used as structured code can be executed on any appropriate device or host machine as discussed elsewhere herein.

The data plane 710 includes one or more resources, servers, hosts, instances, routers, switches, data stores, other similar components, or a combination thereof. The resources of the data plane 710 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 710 can include several separate data tables, databases, or other data storage mechanisms and media for storing data relating to a particular aspect. For example, the data plane 710 illustrated includes mechanisms for storing usage data 712 and user information 716, which can be used to generate the energy usage alert notification. The data plane 710 is also shown to include a mechanism for storing similar user data 714, which can be used for purposes such as reporting a comparative analysis of the usage data for the corresponding utility customer. The data plane 710 is operable, through logic associated therewith, to receive instructions from the application server 708 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 7. Thus, the system 700 in FIG. 7 is provided merely as one example, and does not limit the scope of the disclosure.

Figure 8:
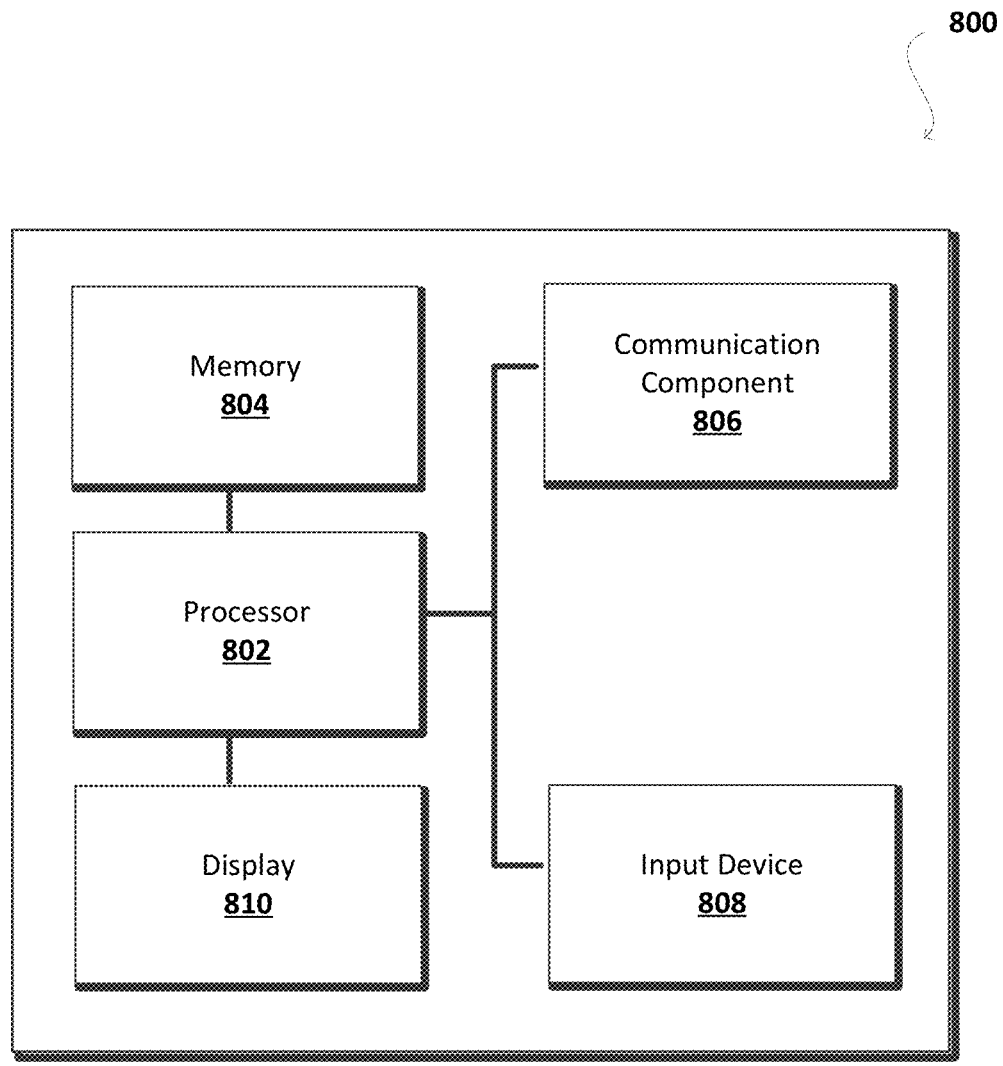
FIG. 8 illustrates an example configuration of components of a computing device, according to certain aspects of the technology.

FIG. 8 illustrates an example configuration of components of a computing device 800, e.g., the climate control devices 103a-103n of FIG. 1, according to certain aspects of the subject technology. In this example, the computing device 800 includes a processor 802 for executing instructions that can be stored in a memory device or element 804. The instructions may cause the computing device 800 to execute a computer-implemented method for processing energy usage alerts from the energy usage alert system 100 (FIG. 1) and/or receive instructions to automatically adjust settings (e.g., temperature settings, alarm settings, power settings) of the client computing device 800. As would be apparent to one of ordinary skill in the art, the computing device 800 can include many types of memory, data storage, or non-transitory computer-readable storage media, such as a first data storage for program instructions for execution by the processor 802, a separate storage for usage history or user information, a removable memory for sharing information with other devices, etc. In some embodiments, the computing device 800 can include one or more communication components 806, such as a Wi-Fi, Bluetooth®, radio frequency, near-field communication, wired, or wireless communication system. The computing device 800 in many embodiments can communicate with a network, such as the Internet, and may be able to communicate with other such devices (e.g., the energy usage alert system 100, other climate control devices). As discussed, the computing device 800 in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The computing device 800 includes some type of display element 810, such as a touch screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology.

What is claimed is:

1. A computer-implemented method performed by a computing device for providing alert notifications, comprising:
   determining, by a processor of the computing device, a set of coefficients associated with energy consumption data of a commodity for a utility customer, the set of coefficients including a base-load coefficient corresponding to a base load of energy used by a building, a cooling coefficient corresponding to a first amount of energy used to cool the building given an outdoor temperature, and a heating coefficient corresponding to a second amount of energy used to heat the building given the outdoor temperature;
   obtaining, by the processor from a third party service provider, weather data corresponding to a portion of a billing period;
   determining, by the processor, first forecasted usage data for the portion of the billing period based at least in part on the base-load coefficient, the cooling coefficient applied to cooling degree days of the portion of the billing period, the heating coefficient applied to heating degree days of the portion of the billing period, and the weather data;
   determining, by the processor, second forecasted usage data for a length of the billing period based at least in part on the first forecasted usage data, wherein the length of the billing period being greater than the portion of the billing period;
   determining, by the processor, an unusual energy usage projection for the utility customer based at least in part on the second forecasted usage data being greater than a threshold usage;
   generating, by the processor, an alert notification including an indication of the unusual energy usage projection;
   modifying, by the processor, the alert notification to include an instruction for causing an adjustment to a setting in a climate control device; and
   transmitting, by the processor of the computing device, the alert notification over a data communication network to the climate control device, wherein the instruction automatically adjusts the setting in the climate control device.

2. The computer-implemented method of claim 1, further comprising:
   sending the alert notification to the utility customer, the unusual energy usage projection relating to a likelihood of the utility customer projected to receive a utility bill higher than expected.

3. The computer-implemented method of claim 1, wherein the cooling coefficient is derived from cooling degree values compared to energy use values.

4. The computer-implemented method of claim 1, wherein the first forecasted usage data is determined using an expression defined as period_to_date_days*coefficient$_{base-load}$+period_to_date_cooling_degree_days*coefficient$_{cooling}$+period_to_date_heating_degree_days*coefficient$_{heating}$, where the period_to_date_days corresponds to the number of days into the billing period, the period_to_date_cooling_degree_days is the number of degrees related to cooling by the commodity per day with respect to a temperature threshold, period_to_date_heating_degree_days is the number of degrees related to heating by the commodity per day with respect to the temperature threshold, the coefficient$_{base-load}$ is the base-load coefficient, the coefficient$_{cooling}$ is the cooling coefficient, and the coefficient$_{heating}$ is the heating coefficient.

5. The computer-implemented method of claim 1, further comprising:
   applying a rate structure to the second forecasted usage data to determine a forecasted bill amount corresponding to the length of the billing period, wherein the unusual energy usage projection for the utility customer is based at least in part on the forecasted bill amount being greater than a bill amount for the prior time period.

6. The computer-implemented method of claim 1, wherein determining the second forecasted usage data comprises scaling the first forecasted usage data by a number of days corresponding to the length of the billing period.

7. A computing device for energy usage alerts, the computing device comprising:
   at least one processor; and
   memory storing instructions that, when executed by the at least one processor, cause the computing device to:
      determine a first forecasted usage for a first portion of the billing period of a utility customer based on a set of coefficients and first weather data, the set of coefficients including a base-load coefficient corresponding to a base load of energy used by a building, a cooling coefficient corresponding to a first amount of energy used to cool the building given an outdoor temperature, and a heating coefficient corresponding to a second amount of energy used to heat the building given the outdoor temperature;
      wherein the first forecasted usage is determined based at least in part on the base-load coefficient, the cooling coefficient applied to cooling degree days of the portion of the billing period, and the heating coefficient applied to heating degree days of the portion of the billing period;
      determine a second forecasted usage for a second portion of the billing period based on the set of coefficients and second weather data, the second portion being subsequent in time of the first portion;
      determine an unusual energy usage projection based at least in part on a combination of the first forecasted usage and the second forecasted usage being greater than a threshold usage data;
generate an alert notification including an indication of the unusual energy usage projection;
modify the alert notification to include an instruction for causing an adjustment to a setting in a climate control device; and
transmit, by the computing device, the alert notification over a data communication network to the climate control device, wherein the instruction automatically adjusts the setting in the climate control device.

8. The computing device of claim 7, wherein the instructions further cause the computing device to:
send the alert notification to the utility customer, the unusual energy usage projection relating to a likelihood of the utility customer projected to receive a utility bill higher than expected.

9. The computing device of claim 7, wherein the heating coefficient is derived from heating degree values compared to energy use values.

10. The computing device of claim 7, wherein the first forecasted usage data is determined using an expression defined as period_to_date_days*$coefficient_{base\text{-}load}$+period_to_date_cooling_degree_days*$coefficient_{cooling}$+period_to_date_heating_degree_days*$coefficient_{heating}$, where the period_to_date_days corresponds to the number of days into the billing period, the period_to_date_cooling_degree_days is the number of degrees related to cooling by the commodity per day with respect to a temperature threshold, period_to_date_heating_degree_days is the number of degrees related to heating by the commodity per day with respect to the temperature threshold, the $coefficient_{base\text{-}load}$ is the base-load coefficient, the $coefficient_{cooling}$ is the cooling coefficient, and the $coefficient_{heating}$ is the heating coefficient.

11. The computing device of claim 7, wherein the second forecasted usage data is determined using an expression defined as remaining_days*$coefficient_{base\text{-}load}$+(forecast_cooling_degree_days/remaining_days)*$coefficient_{cooling}$+(forecast_heating_degree_days/remaining_days)*$coefficient_{heating}$, where the remaining_days is the second portion corresponding to the number of days remaining in the billing period, the forecast_cooling_degree_days is the projected number of degrees related to cooling by the commodity per day with respect to a temperature threshold, forecast_heating_degree_days is the projected number of degrees related to heating by the commodity per day with respect to the temperature threshold, the $coefficient_{base\text{-}load}$ is the base-load coefficient, the $coefficient_{cooling}$ is the cooling coefficient, and the $coefficient_{heating}$ is the heating coefficient.

12. The computing device of claim 7, wherein the instructions further cause the computing device to:
apply a rate structure to the second forecasted usage data to determine a forecasted bill amount corresponding to the length of the billing period, wherein the unusual energy usage projection for the utility customer is based at least in part on the forecasted bill amount being greater than a bill amount for the prior time period.

13. The computing device of claim 7, wherein the instructions further cause the computing device to:
determine an actual usage projection based on actual usage data associated with one or more utility customers similar to the utility customer; and
determine whether the unusual energy usage projection and the actual usage projection indicate a utility bill for the utility customer is greater than projected,
wherein the indication included in the alert notification comprises first information indicating an increase in the utility bill is due to weather if both actual usage projection and the unusual energy usage projection indicate the utility bill is greater than projected, and
wherein the indication comprises second information indicating an increase in the utility bill is due to non-weather conditions if the actual usage projection indicates the utility bill is greater than projected and not the unusual energy usage projection.

14. A non-transitory computer readable storage medium storing instructions for unusual usage alerts without smart meter data on a computing device, the instructions when executed by a processor of a computing device causing the processor to:
determine first forecasted usage data relating to a utility customer for at least a portion of a billing period based at least in part on a set of coefficients and weather data, the set of coefficients including a base-load coefficient corresponding to a base load of energy used by a building, a cooling coefficient corresponding to a first amount of energy used to cool the building given an outdoor temperature, and a heating coefficient corresponding to a second amount of energy used to heat the building given the outdoor temperature;
wherein the first forecasted usage is determined based at least in part on the base-load coefficient, the cooling coefficient applied to cooling degree days of the portion of the billing period, and the heating coefficient applied to heating degree days of the portion of the billing period;
determine second forecasted usage data for a length of the billing period based at least in part on the first forecasted usage data;
determine an unusual energy usage projection based at least in part on the second forecasted usage data being greater than usage data for a prior time period corresponding to the billing period;
determine that at least one of the unusual energy usage projection or an actual usage projection indicate a projected utility bill for the utility customer is greater than a threshold, the actual usage projection relating to actual usage data associated with one or more utility customers similar to the utility customer;
generate an alert notification including an indication of the unusual energy usage projection, the indication including information relating to a cause for an increase in the utility bill based on the unusual energy usage projection or the actual usage projection determined to be greater than the threshold;
modify the alert notification to include an instruction for causing an adjustment to a setting in a climate control device; and
transmit, by the computing device, the alert notification over a data communication network to the climate control device, wherein the instruction automatically adjusts the setting in the climate control device.

15. The non-transitory computer readable storage medium of claim 14, wherein the instructions further cause the computing device to:
send the alert notification to the utility customer, the unusual energy usage projection relating to a likelihood of the utility customer projected to receive a utility bill higher than expected.

16. The non-transitory computer readable storage medium of claim 14, wherein the heating coefficient is derived from heating degree values compared to energy use values.

17. The non-transitory computer readable storage medium of claim 14, wherein the first forecasted usage data is determined using an expression defined as period_to_date_days*$coefficient_{base-load}$+period_to_date_cooling_degree_days*$coefficient_{cooling}$+period_to_date_heating_degree_days*$coefficient_{heating}$, where the period_to_date_days corresponds to the number of days into the billing period, the period_to_date_cooling_degree_days is the number of degrees related to cooling by the commodity per day with respect to a temperature threshold, period_to_date_heating_degree_days is the number of degrees related to heating by the commodity per day with respect to the temperature threshold, the $coefficient_{base-load}$ is the base-load coefficient, the $coefficient_{cooling}$ is the cooling coefficient, and the $coefficient_{heating}$ is the heating coefficient.

18. The non-transitory computer readable storage medium of claim 14, wherein the second forecasted usage data is determined using an expression defined as remaining_days*$coefficient_{base-load}$+(forecast_cooling_degree_days/remaining_days)*$coefficient_{cooling}$+(forecast_heating_degree_days/remaining_days)*$coefficient_{heating}$, where the remaining_days is the second portion corresponding to the number of days remaining in the billing period, the forecast_cooling_degree_days is the projected number of degrees related to cooling by the commodity per day with respect to a temperature threshold, forecast_heating_degree_days is the projected number of degrees related to heating by the commodity per day with respect to the temperature threshold, the $coefficient_{base-load}$ is the base-load coefficient, the $coefficient_{cooling}$ is the cooling coefficient, and the $coefficient_{heating}$ is the heating coefficient.

19. The non-transitory computer readable storage medium of claim 14, wherein the instructions further cause the computing device to:
apply a rate structure to the second forecasted usage data to determine a forecasted bill amount corresponding to the length of the billing period, wherein the unusual energy usage projection for the utility customer is based at least in part on the forecasted bill amount being greater than a bill amount for the prior time period.

20. The non-transitory computer readable storage medium of claim 14, wherein the indication included in the alert notification comprises first information indicating an increase in the utility bill is due to weather if both actual usage projection and the unusual energy usage projection indicate the utility bill is greater than projected, and wherein the indication comprises second information indicating an increase in the utility bill is due to non-weather conditions if the actual usage projection indicates the utility bill is greater than projected and not the unusual energy usage projection.

21. A computer-implemented method implemented by a computing device for providing an unusual power consumption alert notification, the method comprising:
calculating a first forecasted usage amount for a first portion of a current billing period, wherein the first forecasted usage amount is determined based on a set of coefficients and historic weather data corresponding with the first portion of the current billing period, the set of coefficients including a base-load coefficient corresponding to a base load of energy used by a building, a cooling coefficient corresponding to a first amount of energy used to cool the building given an outdoor temperature, and a heating coefficient corresponding to a second amount of energy used to heat the building given the outdoor temperature;
wherein the first forecasted usage is determined based at least in part on the base-load coefficient, the cooling coefficient applied to cooling degree days of the portion of the billing period, and the heating coefficient applied to heating degree days of the portion of the billing period;
calculating a second forecasted usage amount for a second portion of the current billing period, wherein the second forecasted usage data is determined using forecasted weather data for the second portion of the current billing period and the climate control disaggregation coefficients;
calculating an energy usage projection for the current billing period based on the first forecasted usage amount and the second forecasted usage amount;
determining whether the energy use projection exceeds a predetermined threshold;
generating an alert notification to indicate an unusual energy use projection in response to a determination that the energy use projection exceeds the predetermined threshold;
modifying the alert notification to include an instruction for causing an adjustment to a setting in a climate control device; and
transmitting, by the computing device, the alert notification over a data communication network to the climate control device, wherein the instruction automatically adjusts the setting in the climate control device.

* * * * *